(12) United States Patent
Filippov et al.

(10) Patent No.: US 10,313,705 B2
(45) Date of Patent: Jun. 4, 2019

(54) METHOD AND APPARATUS FOR PRE-PREDICTION FILTERING FOR USE IN BLOCK-PREDICTION TECHNIQUES

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 15/290,148

(22) Filed: Oct. 11, 2016

(65) Prior Publication Data

US 2017/0034536 A1 Feb. 2, 2017

Related U.S. Application Data

(63) Continuation of application No. PCT/RU2014/000374, filed on May 23, 2014.

(51) Int. Cl.
*H04N 19/86* (2014.01)
*H04N 19/82* (2014.01)
(Continued)

(52) U.S. Cl.
CPC ........... *H04N 19/86* (2014.11); *H04N 19/117* (2014.11); *H04N 19/156* (2014.11); *H04N 19/176* (2014.11); *H04N 19/82* (2014.11)

(58) Field of Classification Search
None
See application file for complete search history.

(56) References Cited

U.S. PATENT DOCUMENTS

2006/0280372 A1    12/2006  Han
2012/0082224 A1     4/2012  Van et al.
(Continued)

FOREIGN PATENT DOCUMENTS

JP    2008541653 A    11/2008
JP    2012533215 A    12/2012
(Continued)

OTHER PUBLICATIONS

Kang et al. "Non-RCE3: Implicit derivation for adaptively turning filtering off in intra prediction," 15. JCT-VC Meeting; Geneva; Joint Collaborative Team on Video Coding of ISO/IEC JTC1/SC29/WG11 and ITU-T SG.16; URL: http://wftp3.itu.int/av-arch/jctvc-site/, No. JCTVC-O0181-v3 (Year: 2013).*
(Continued)

*Primary Examiner* — Anand S Rao
*Assistant Examiner* — Tyler B Edwards
(74) *Attorney, Agent, or Firm* — Conley Rose, P.C.

(57) ABSTRACT

A prediction technique, which use pre-prediction filtering techniques to reduce noise influence on the predicted samples of a block to be reconstructed, is presented. The prediction techniques suggested herein can be for example used in an encoding apparatus or a decoding apparatus. The reference samples that are used to reconstruct a given block of pixels of an image are categorized or segmented into subsets. The subsets may be processed differently, e.g. the subsets may be subjected to distinct filters. Examples of such filters include smoothing filters and/or deblocking filters, which are applied to the respective subsets of the reference samples.

20 Claims, 18 Drawing Sheets

(51) Int. Cl.
*H04N 19/176* (2014.01)
*H04N 19/117* (2014.01)
*H04N 19/156* (2014.01)

(56) References Cited

U.S. PATENT DOCUMENTS

| | | | |
|---|---|---|---|
| 2012/0082236 A1* | 4/2012 | Haskell | H04N 7/26888 375/240.24 |
| 2012/0114048 A1 | 5/2012 | Sole et al. | |
| 2012/0147955 A1 | 6/2012 | Budagavi | |
| 2012/0163479 A1 | 6/2012 | Gisquet et al. | |
| 2012/0195378 A1 | 8/2012 | Zheng et al. | |
| 2012/0320974 A1 | 12/2012 | Li et al. | |
| 2013/0034159 A1 | 2/2013 | Siekmann et al. | |
| 2013/0136371 A1 | 5/2013 | Ikai et al. | |

FOREIGN PATENT DOCUMENTS

| | | |
|---|---|---|
| JP | 2014506755 A | 3/2014 |
| KR | 20130054396 A | 5/2013 |
| KR | 20130063030 A | 6/2013 |
| KR | 20130119494 A | 10/2013 |
| WO | 2011000255 A1 | 1/2011 |
| WO | 2011158657 A1 | 12/2011 |

OTHER PUBLICATIONS

Van Der Auwera et al. "CE6.b: SDIP Harmonization with Deblocking, MDIS and HE Residual Coding," 97. MPEG Meeting; Jul. 18, 2011-Jul. 22, 2011; Torino; Motion Picture Expert Group or ISO/IEC JTC1/SC29/WG11, No. m20989, Jul. 17, 2011, XP030049552 ( Year: 2011).*

"Informational technology—High efficiency coding and media delivery in heterogeneous environments—Part 2: High efficiency video coding," International Standard, ISO/IEC 23008-2, Dec. 1, 2013, 13 pages.

Amonou, I., et al., "Description of video coding technology proposal by France Telecom, NTT, NTT DOCOMO, Panasonic and Technicolor," JCTVC-A114, Apr. 15-23, 2010, 42 pages.

Dong, J., "Crosscheck for JCTVC-G358 new modes for chroma intra prediction," JCTVC-G273, Nov. 21-30, 2011, 1 page.

Bossen, F., et al., "Common test conditions and software reference configurations," JCTVC-L1100, m28412, Jan. 14-23, 2013, 4 pages.

Ohm, J., "Complexity and Delay Analysis of MCTF Interframe Wavelet Structures," ISO/IECT JTC1/SC29/WG11, MPEG/M8520, Jul. 2002, 16 pages.

Sullivan, G., et al., "Overview of the High Efficiency Video Coding (HEVC) Standard," IEEE Transactions on Vircuits and Systems for Video Technology, vol. 22, No. 12, Dec. 2012, pp. 1649-1668.

"Series H: Audiovisual and Multimedia Systems, Infrastructure of audiovisual services—Coding of moving video, Advanced video coding for generic audiovisual services," ITU-T, H.264, Feb. 2014, 790 pages.

"Series H: Audiovisual and Multimedia Systems, Infrastructure of audiovisual services—Coding of moving video, High efficiency video coding," ITU-T, H.265, Apr. 2013, 317 pages.

Minezawa, A., et al., "Block Boundary Filtering for Intra Prediction Samples," IEEE International Conference on Consumer Electronics (ICCE), Jan. 11-14, 2013, pp. 641-644.

Liu, D., et al., "Edge-Oriented Uniform Intra Prediction," IEEE Transactions on Image Processing, vol. 17, No. 10, Oct. 2008, pp. 1827-1836.

Auwera, G., et al., "CE6.e: Report on Mode-Dependent Intra Smoothing Modifications," JCTVC-F126, Jul. 14-22, 2011, 6 pages.

Auwera, G., et al., "CE6.b: SDIP Harmonization with Deblocking, MDIS and HE Residual Coding," JCTVC-F556, Jul. 14-22, 2011, 22 pages.

Kang, J., et al., "Non-RCE3: Implicit derivation for adaptively turning filtering off in intra prediction," Oct. 24, 2013, JCTVC-D0181, 14 pages.

Kang, J., et al., "Non-RCE3: Implicit derivation for adaptively turning filtering off in intra prediction," JCTVC-O0181_r2, Oct. 23-Nov. 1, 2013, 8 pages.

Foreign Communication From a Counterpart Application, PCT Application No. PCT/RU2014/000374, International Search Report dated Jan. 22, 2015, 4 pages.

Foreign Communication From a Counterpart Application, Korean Application No. 10-2016-7015317, Korean Notice of Preliminary Rejection dated Sep. 15, 2017, 8 pages.

Foreign Communication From a Counterpart Application, Korean Application No. 10-2016-7015317, Korean Notice of Preliminary Rejection dated Sep. 28, 2017, 6 pages.

Iguchi, K., et al., "Performance report of Iterative Adjustment Intra Prediction," XP030007607, JVTVC-B027, Jul. 21-28, 2010, 4 pages.

Sekiguchi, S., et al., "DCT-based noise filtering for intra prediction samples," XP030007647, JCTVC-B067, Jul. 21-28, 2010, 6 pages.

Jeon, B., et al., "On Intra Smoothing," XP030009127, JCTVC-F104, Jul. 14-22, 2011, 8 pages.

Richardson, I., "H.264 and MPEG-4 Video Compression: Video Coding for Next-generation Multimedia," XP055040647, H.264/MPEG4 Part 10, 2003, pp. 159-223.

Foreign Communication From a Counterpart Application, European Application No. 14812312.8, European Office Action dated Jun. 13, 2017, 7 pages.

Foreign Communication From a Counterpart Application, Japanese Application No. 2016-541304, Japanese Office Action dated Jul. 18, 2017, 4 pages.

Foreign Communication From a Counterpart Application, Japanese Application No. 2016-541304, English Translation of Japanese Office Action dated Jul. 18, 2017, 4 pages.

Clare, G., et al., "Sign Data Hiding," JCTVC-G271, m21833, Nov. 21-30, 2011, 9 pages.

Foreign Communication From a Counterpart Application, Korean Application No. 10-2016-7015317, Korean Notice of Allowance dated Jan. 25, 2018, 2 pages.

Foreign Communication From a Counterpart Application, Korean Application No. 10-2016-7015317, English Translation of Korean Notice of Allowance dated Jan. 25, 2018, 1 pages.

List, P., et al., "Adaptive Deblocking Filter," IEEE Transactions on Circuits and Systems for Video Technology vol. 13, Issue 7, XP011221094, Jul. 2003, 6 pages.

Foreign Communication From a Counterpart Application, European Application No. 14812312.8, Extended European Search Report dated Apr. 3, 2019, 6 pages.

* cited by examiner

METHOD AND APPARATUS FOR PRE-PREDICTION FILTERING FOR USE IN BLOCK-PREDICTION TECHNIQUES

CROSS-REFERENCE TO RELATED APPLICATION

This application is a continuation of International Application No. PCT/RU2014/000374, filed on May 23, 2014, which is hereby incorporated by reference in its entirety.

TECHNICAL FIELD

The embodiments of the application relate to methods for reconstructing blocks of an image using prediction and their implementation in hardware and/or software. In particular, the embodiments of the application relate to improved prediction techniques, e.g. block-prediction using intra- or inter-prediction, which use pre-prediction filtering techniques to reduce noise influence on the predicted samples of a block to be reconstructed. The prediction techniques suggested herein can be for example used in an encoding apparatus or a decoding apparatus.

BACKGROUND

Lossy data compression has numerous applications, especially in communications, broadcasting, entertainment, and security. Video compression is a challenging task, because large compression ratios are required to transmit high-quality and high-resolution pictures over existing communication channels. This task is even more challenging in the context of wireless and mobile communications, or real-time encoding of media.

The recently adopted International Telecommunication Union Telecommunication Standardization Sector (ITU-T) H.265/High Efficiency Video Coding (HEVC) standard (International Organization for Standardization (ISO)/International Electrotechnical Commission (IEC), 23008-2:2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity. An overview on the ITU-T H.265/HEVC standard is given in the article by Gary J. Sullivan, "Overview of the High Efficiency Video Coding (HEVC) Standard", in The Institute of Electrical and Electronics Engineers (IEEE) Transactions on Circuits and Systems for Video Technology, Vol. 22, No. 12, December 2012, the entire content of which is incorporated herein by reference.

Similar to the ITU-T H.264/advanced video coding (AVC) video coding standard, the HEVC/H.265 video coding standard provides for a division of the source picture into blocks, e.g. coding units (CUs). Each of the CUs could be further split into either smaller CUs or prediction units (PUs). A PU could be intra- or inter-predicted according to the type of processing applied for the pixels of PU. In case of inter-prediction, a PU represents an area of pixels that is processed by motion compensation using a motion vector specified for a PU. For intra prediction PU specifies prediction mode for a set of transform units (TUs). A TU can have different sizes (e.g., 4×4, 8×8, 16×16 and 32×32 pixels) and could be processed in different ways. For a TU transform coding is being performed, i.e. the prediction error is being transformed with a discrete cosine transform (DCT) and quantized. Resulting quantized transform coefficients are grouped into coefficient groups (CGs), each CG having 16 quantized transform coefficients.

As noted above, the core tools of these standards or similar proprietary codecs to encode the blocks of picture are inter- and intra-prediction, spectrum-transformation (e.g., DCT or its integer approximation) and quantization. Inter- and intra-prediction tools are used to generate a prediction signal for a given block. At the encoder side, the difference between a source block and its prediction, the so-called residual signal, is transformed into their spectrum, i.e. source block pixels are represented by transform coefficients in frequency domain. Further, the coefficients are quantized. Non-zero and zero quantized transform coefficients are often referred to as significant and insignificant coefficients, respectively. All syntax elements including quantized transform coefficients and side information (e.g., intra prediction modes for intra-coding and motion vectors for inter-coding) are binarized and entropy encoded. The part of entropy encoded coefficients in a compressed H.265/HEVC bit-stream may exceed 80%.

The stages of encoding quantized transform coefficients are as follows.

Encoding the position of last significant coefficient, i.e. the last non-zero quantized transform coefficient.

Encoding the significance map that is used to restore positions of all the non-zero coefficients.

Sign encoding of the significant coefficients.

Magnitude encoding of the significant coefficients.

These stages are performed in the context of quantized transform coefficients being split into so-called CGs. Each CG is a subset that typically consists of 4×4 coefficients.

As noted above, state-of-the-art video coding standards are based on partitioning of a source picture (image) into blocks. Processing of these blocks depends on their size, spatial position and a coding mode specified by an encoder. Coding modes could be classified into two groups according to the type of prediction: intra- and inter-prediction modes. Intra-prediction uses pixels of the same image to generate reference samples based on which the prediction values for the pixels of the block being reconstructed are predicted. Intra-prediction could be also referred to as spatial prediction. Inter-prediction modes are designed for temporal prediction and uses reference samples of previous and/or next pictures to predict pixels of the block of the current picture.

Due to different type of redundancy, prediction processes for intra- and inter-coding are different. Intra-prediction typically constructs a one-dimensional buffer of reference samples. Inter-prediction uses sub-pixel interpolation of two-dimensional reference pixel matrix.

However, during standardization of ITU-T H.264/AVC a third technique for motion prediction has also been considered: motion compensated temporal filtering (MCTF). MCTF processes a three-dimensional (3D) array of pixels that is constructed by stacking up blocks of pixels. Each of these blocks is extracted from its own picture and stacking of these blocks is performed in the same order as specified for the pictures of the video sequence. The output of MCTF is two sets of blocks: high-pass blocks (residuals) and low-pass blocks. These blocks are further processed to produce prediction and residual blocks.

An overview on MCTF is provided in J. R. Ohm, "Complexity and delay analysis of MCTF interframe wavelet structures," ISO/IEC JTC1/SC29/WG11, Document M8520, July, 2002. MCTF is implemented by employing a lifting process as exemplified in FIG. 18, in which the motion compensation features of H.26x video coding standards could be reused in MCTF prediction and update steps.

As shown in FIG. 18, for two consecutive pictures A and B of a video sequence a pyramid-based motion-compensated transform is performed to obtain "temporal" low pass frame L and high pass frame H. This "temporal" prediction could be written as:

$$H(m, n) =$$
$$B(m, n) - (1 - \alpha)(1 - \beta)A(m - k, n - l) - (1 - \alpha)\beta A(m - k, n - l + 1) -$$
$$\alpha(1 - \beta)A(m - k + 1, n - l) - \alpha\beta A(m - k + 1, n - l + 1)$$
$$L(m, n) = A(m, n) + \frac{\alpha\beta}{2}H(m + k - 1, n + l - 1) +$$
$$\frac{\alpha(1 - \beta)}{2}H(m + k - 1, n + l) + \frac{(1 - \alpha)\beta}{2}H(m + k, n + l - 1) +$$
$$\frac{(1 - \alpha)(1 - \beta)}{2}H(m + k, n + l) =$$
$$\frac{1}{2}[\alpha\beta B(m + k - 1, n + l - 1) + \alpha(1 - \beta)B(m + k - 1, n + l) +$$
$$(1 - \alpha)\beta B(m + k, n + l - 1) + (1 - \alpha)(1 - \beta)B(m + k, n + l) -$$
$$(1 - \alpha)(1 - \beta)\alpha\beta A(m - 1, n - 1) -$$
$$(\beta - \beta^2)(1 - 2\alpha + 2\alpha^2)A(m, n - 1) - (1 - \alpha)(1 - \beta)\alpha\beta$$
$$A(m + 1, n - 1) - (\alpha - \alpha^2)(1 - 2\beta + 2\beta^2)A(m - 1, n) +$$
$$(2 - (1 - 2\alpha + 2\alpha^2)(1 - 2\beta + 2\beta^2))A(m, n) - (\alpha - \alpha^2)(1 - 2\beta + 2\beta^2)$$
$$A(m + 1, n) - (1 - \alpha)(1 - \beta)\alpha\beta A(m - 1, n + 1) - (\beta - \beta^2)$$
$$(1 - 2\alpha + 2\alpha^2)A(m, n + 1) - (1 - \alpha)(1 - \beta)\alpha\beta A(m + 1, n + 1)],$$

where $\alpha$ and $\beta$ are weighting coefficients used for subpixel interpolation, and m, k, n, l are pixel coordinates within a respective picture.

It is known that picture coding introduces visual artifacts into a reconstructed image. These artifacts could be caused by quantization noise and blocking effects. Prediction techniques, such as intra- and inter-prediction, use already decoded/reconstructed samples as reference samples to predict a block of pixels, and therefore, noise inside this decoded information may influence the prediction accuracy. This noise may also imply higher energy of the residual signal for a block to be encoded, which may be addressed by increased bit-rate, or by accepting noticeable artifacts if increasing the bit-rate of the encoded stream is not acceptable.

SUMMARY

In view of this application, one object of the embodiments of the application is to suggest a prediction technique which is capable of reducing noise influence on the predicted samples of a block without suppressing picture details.

The foregoing and other objects are achieved by the features of the independent claims. Further implementation forms are apparent from the dependent claims, the description and the figures.

One aspect of the embodiment of the application thus relates to improved prediction techniques, e.g. block-prediction using intra- or inter-prediction, which use pre-prediction filtering techniques to reduce noise influence on the predicted samples of a block to be reconstructed. The prediction techniques suggested herein can be for example used in an encoding apparatus or a decoding apparatus. The reference samples that are used to reconstruct a given block of pixels of an image are categorized or segmented into subsets. The subsets may be processed differently, e.g. the subsets may be subjected to distinct filters. Examples of such filters include smoothing filters and/or deblocking filters, which are applied to the respective subsets of the reference samples.

A first implementation of the aspect of the embodiments of the application relates to a method for reconstructing blocks of an image using prediction. The method comprises determining reference samples of one or more already decoded blocks to be used for predicting a block to be reconstructed, selecting a first subset of the reference samples and a second subset of the reference samples, performing a pre-prediction filtering of the selected reference samples of said first subset and said second subset, wherein the filter parameters for filtering the reference samples of the first subset differ from the filter parameters for filtering the reference samples of the second subset, and reconstructing said block by prediction based on the reference samples including said pre-prediction filtered reference samples of the first subset and the second subset.

In a second implementation, which is a more detailed implementation of the first implementation, the method further comprises determining the size of the block to be reconstructed and/or the prediction mode that has been employed for encoding the block to be reconstructed, and determining said first and/or second subset of reference samples and/or selecting parameters for said pre-prediction filtering is based on the size and/or the prediction mode.

In a third implementation, which is a more detailed implementation of the first or the second implementation, intra-prediction is used for reconstructing the block, and determining the prediction mode that has been employed for encoding the block to be reconstructed comprises determining whether the intra-prediction is according to a vertical mode, a horizontal mode, or an angular mode. In case the intra-prediction is according to another angular mode, said pre-prediction filtering of reference samples of the first subset and the second subset is performed. In case the intra-prediction is according to the vertical mode, a pre-prediction filtering is applied to reference samples located to the left and/or left-below the block to be reconstructed. In case the intra-prediction is according to the horizontal mode, a pre-prediction filtering is applied to reference samples located above and/or above-right the block to be reconstructed.

In a fourth implementation, which is a more detailed implementation of the third implementation, the first subset comprises reference samples located to the left and/or left-below the block to be reconstructed, and the second subset comprises reference samples located above and/or above-right the block to be reconstructed.

In a fifth implementation, which is a more detailed implementation of the third or the fourth implementation, determining the prediction mode that has been employed for encoding the block to be reconstructed comprises determining whether the intra-prediction is according to a vertical mode, a horizontal mode, or an angular mode. In case the intra-prediction is according to the diagonal mode, all reference samples are subjected to pre-prediction filtering.

In a sixth implementation, which is a more detailed implementation of one of the first to the fifth implementation, said second subset comprises reference samples of one or more blocks for which no residual has been coded in the encoded video stream. Further, said block is reconstructed by prediction based on the reference samples including said filtered first subset of reference samples and filtered second subset of reference samples.

In a seventh implementation, which is a more detailed implementation of one of the first to the sixth implementation, the method further comprises applying a deblocking filter to pre-prediction filtered reference samples of different decoded blocks, said pre-prediction filtered reference samples are reference samples at the boundaries between decoded blocks.

An eighth implementation relates to a method for reconstructing blocks of image using prediction. The method comprises determining reference samples of one or more already decoded blocks to be used for predicting a block to be reconstructed, selecting a subset of the reference samples to which a filter is to be applied prior to prediction and performing a pre-prediction filtering of the selected reference samples of said subset, and reconstructing said block by prediction based on the reference samples including said filtered reference samples of said subset. Selection of said subset and the pre-prediction filtering of the reference samples of said subset are repeated prior to reconstruction of said block by prediction.

In a ninth implementation, which is a more detailed implementation of the eighth implementation, the filter parameters for filtering the reference samples of the subset differ in said repetitions of selecting of said subset and pre-prediction filtering.

In a tenth implementation, which is a more detailed implementation of the eighth or ninth implementation, the subsets selected in the different repetitions are distinct or overlapping.

In a eleventh implementation, which is a more detailed implementation of one of the eighth to the tenth implementation, in one of the repetitions, the selected subset of reference samples comprises all reference samples.

In a twelfth implementation, which is a more detailed implementation of one of the eighth to eleventh implementation, there are three repetitions, wherein the first two repetitions are performed on the original reference samples to obtain filtered reference samples, while the third repetition is performed on the filtered reference samples obtained in the first two repetitions.

In a thirteenth implementation, which is a more detailed implementation of one of the eighth to twelfth implementation, in a first repetition the respective subset of reference samples is filtered based on the size of the block to be reconstructed and/or the prediction mode that has been employed for encoding the block to be reconstructed. In a second repetition the respective subset of reference samples comprises reference samples of one or more blocks for which no residual has been coded in the encoded video stream, and in a third repetition a deblocking filter is applied to the reference samples filtered in the first or second repetition, said filtered reference samples are reference samples at the boundaries between decoded blocks.

In a fourteenth implementation, which is a more detailed implementation of the seventh or thirteenth implementation, the method further comprises adding a decoded residual for said block to be decoded to said reconstructed block to obtain a decoded block, and applying an in-loop deblocking filter (ILDF) to the decoded block.

In a fifteenth implementation, which is a more detailed implementation of one of the first to fourteenth implementation, the reference samples are forming two one-dimensional arrays. One array comprises a column of samples of one or more decoded neighboring blocks to the left or right of the block to be decoded, and the other array comprises a row of samples of one or more decoded neighboring blocks on top or bottom of the block to be decoded.

In a sixteenth implementation, which is a more detailed implementation of one of the first to fifteenth implementation, pre-prediction filtering comprises applying a smoothing filter to at least one subset of the reference samples.

In a seventeenth implementation, which is a more detailed implementation of one of the first, second, and sixth to sixteenth implementation, inter-prediction is used for reconstructing the block of pixels.

In an eighteenth implementation, which is a more detailed implementation of the seventeenth implementation, the reference samples define a two-dimensional reference area within one or more decoded blocks to be used for inter-prediction when reconstructing said block. One of the subsets of reference samples subject to pre-prediction filtering comprises reference samples belonging to a decoded block for which a residual was encoded in the encoded video stream.

In a nineteenth implementation, which is a more detailed implementation of the seventeenth implementation, the reference samples define a two-dimensional reference area within one or more decoded blocks to be used for inter-prediction when reconstructing the block. The step of determining said subsets of reference samples to which a filter is to be applied prior to inter-prediction comprises determining multiple distinct subsets of reference samples based on the result of performing an edge detection on the reference samples of said two-dimensional reference area. Further, performing pre-prediction filtering comprises filtering the reference samples of the subsets using different filter parameters.

In a twentieth implementation, which is a more detailed implementation of the seventeenth implementation, multi-reference inter-prediction is used for reconstructing the block, and the reference samples define a stack of two-dimensional reference areas from the different reference frames to be used for inter-prediction when reconstructing the block. The determination of said subsets of reference samples to which a filter is to be applied prior to prediction comprises determining multiple distinct subsets of reference samples within said stack of two-dimensional reference areas based on the result of performing an edge detection on the reference samples. Moreover, performing pre-prediction filtering comprises filtering the reference samples of the subsets using different filter parameters, and reconstructing the block comprises predicting said block by calculating a weighted sum of filtered reference samples from the stack of two-dimensional reference areas.

A twenty first implementation relates to an apparatus for reconstructing blocks of an image using prediction. The apparatus comprises a reference sample buffer for storing one or more already decoded blocks to be used for predicting a block to be reconstructed, a processing unit configured to select a first subset of the reference samples and a second subset of the reference samples from said reference sample buffer, a filter unit configured to perform a pre-prediction filtering of the selected reference samples of said first subset and said second subset, wherein the filter parameters for filtering the reference samples of the first subset differ from the filter parameters for filtering the reference samples of the second subset, and a prediction unit configured to reconstruct said block by prediction based on the reference samples including said pre-prediction filtered reference samples of the first subset and the second subset.

In a twenty second implementation, which is a more detailed implementation of the twenty first implementation, said processing unit is configured to determine the size of the block to be reconstructed and/or the prediction mode that has been employed for encoding the block to be reconstructed. In addition, said processing unit is further configured to determine said first and/or second subset of reference samples and/or selecting parameters for said pre-prediction filtering is based on the size and/or the prediction mode.

In a twenty third implementation, which is a more detailed implementation of the twenty first or twenty second implementation, intra-prediction is used for reconstructing the block, and said processing unit is configured to determine whether the intra-prediction is according to a vertical mode, a horizontal mode, or an angular mode. In case the intra-prediction is according to another angular mode, said processing unit is configured to cause the filter unit to apply pre-prediction filtering to reference samples of the first subset and the second subset. In case the intra-prediction is according to the vertical mode, said processing unit is configured to cause the filter unit to apply pre-prediction filtering to reference samples located to the left and/or left-below the block to be reconstructed. In case the intra-prediction is according to the horizontal mode, said processing unit is configured to cause the filter unit to apply pre-prediction filtering to reference samples located above and/or above-right the block to be reconstructed.

In a twenty fourth implementation, which is a more detailed implementation of the twenty third implementation, the first subset comprises reference samples located to the left and/or left-below the block to be reconstructed, and the second subset comprises reference samples located above and/or above-right the block to be reconstructed.

In a twenty fifth implementation, which is a more detailed implementation of the twenty third or twenty fourth implementation, the processing unit is configured to determine whether the intra-prediction is according to a vertical mode, a horizontal mode, or an angular mode. In case the intra-prediction is according to the diagonal mode, said processing unit is configured to cause the filter unit to apply pre-prediction filtering to all reference samples.

In a twenty sixth implementation, which is a more detailed implementation of one of the twenty first to twenty fifth implementation, said second subset comprises reference samples of one or more blocks for which no residual has been coded in the encoded video stream, and the prediction unit is configured to reconstruct said block based on the reference samples including said filtered first subset of reference samples and filtered second subset of reference samples.

In a twenty seventh implementation, which is a more detailed implementation of one of the twenty first to twenty sixth implementation, the apparatus further comprises a deblocking filter configured to perform a deblocking of the pre-prediction filtered reference samples of different decoded blocks prior to prediction, wherein said pre-prediction filtered reference samples are reference samples at the boundaries between decoded blocks.

A twenty eighth implementation of the aspect of the embodiment of the application relates to an apparatus for reconstructing blocks of image using prediction. The apparatus comprises a reference sample buffer for storing one or more already decoded blocks to be used for predicting a block to be reconstructed, a processing unit configured to select a subset of the reference samples to which a filter is to be applied prior to prediction, a filter unit adapted to perform a pre-prediction filtering of the selected reference samples of said subset, and a prediction unit configured to reconstruct said block by prediction based on the reference samples including said filtered reference samples of said subset. The processing unit and said filter unit are configured to repeat selecting of said subset and the pre-prediction filtering of the reference samples of said subset prior to reconstruction of said block by prediction.

In a twenty ninth implementation, which is a more detailed implementation of the twenty eighth implementation, the filter unit is configured to use different parameters for filtering the reference samples of the subset in said repetitions.

In a thirtieth implementation, which is a more detailed implementation of the twenty eighth or twenty ninth implementation, said processing unit is configured to select, in the different repetitions, subsets which are distinct or overlapping.

In a thirty first implementation, which is a more detailed implementation of one of the twenty eighth to thirtieth implementation, in one of the repetitions, the selected subset of reference samples comprises all reference samples.

In a thirty second implementation, which is a more detailed implementation of one of the twenty eighth to thirty first implementation, there are three repetitions, wherein said processing unit and said filter unit are configured to perform the first two repetitions the original reference samples to obtain filtered reference samples, and to perform the third repetition on the filtered reference samples obtained in the first two repetitions.

In a thirty third implementation, which is a more detailed implementation of one of the twenty eighth to thirty second implementation, in a first repetition said filter unit filters the respective subset of reference samples based on the size of the block to be reconstructed and/or the prediction mode that has been employed for encoding the block to be reconstructed, in a second repetition the respective subset of reference samples comprises reference samples of one or more blocks for which no residual has been coded in the encoded video stream, and in a third repetition the said filter unit applies a deblocking filter to the reference samples filtered in the first or second repetition, said filtered reference samples are reference samples at the boundaries between decoded blocks.

In a thirty fourth implementation, which is a more detailed implementation of one of the twenty seventh or thirty third implementation the apparatus further comprises a summation unit configured to add a decoded residual for said block to be decoded to said reconstructed block to obtain a decoded block, and an ILDF configured to apply deblocking to the decoded block.

In a thirty fifth implementation, which is a more detailed implementation of one of the twenty first to thirty fourth implementation, the filter unit is configured to apply a smoothing filter to at least one subset of the reference samples.

In a thirty sixth implementation, which is a more detailed implementation of one of the twenty first to thirty fifth implementation, the apparatus is an encoding apparatus for encoding images of a video, or a decoding apparatus for decoding encoded images of a video stream.

A thirty seventh implementation relates to a computer-readable storage medium storing instructions that, when executed by a processing unit, cause the processing unit to perform the method for reconstructing blocks of image using prediction according to one of the various implementations described herein.

A first exemplary embodiment of the above mentioned aspect, relates to a method for reconstructing blocks of an image using prediction. In this method, the reference samples of one or more already decoded blocks to be used for predicting a block to be reconstructed are determined, and a first subset of the reference samples and a second subset of the reference samples is selected. Furthermore, a pre-prediction filtering of the selected reference samples of the first subset and the second subset is performed, wherein the filter parameters for filtering the reference samples of the first subset differ from the filter parameters for filtering the reference samples of the second subset. Following this pre-prediction filtering the block is reconstructed by prediction based on the reference samples including the pre-prediction filtered reference samples of the first subset and the second subset.

In a second exemplary embodiment, which is a more detailed implementation of the first embodiment, the size of the block to be reconstructed and/or the prediction mode that has been employed for encoding the block to be reconstructed is determined, and the determination of the first and/or second subset of reference samples and/or selecting parameters for the pre-prediction filtering is based on the size and/or the prediction mode.

In a third exemplary embodiment, which is a more detailed implementation of the first or second embodiment, intra-prediction is used for reconstructing the block. In this embodiment, the determination of the prediction mode that has been employed for encoding the block to be reconstructed comprises determining whether the intra-prediction is according to a vertical mode, a horizontal mode, or an angular mode. In case the intra-prediction is according to another angular mode, the pre-prediction filtering of reference samples of the first subset and the second subset may be performed. In case the intra-prediction is according to the vertical mode, a pre-prediction filtering may be applied to reference samples located to the left and/or left-below the block to be reconstructed. In case the intra-prediction is according to the horizontal mode, a pre-prediction filtering may be applied to reference samples located above and/or above-right the block to be reconstructed.

In a fourth exemplary embodiment, which is a more detailed implementation of the third embodiment, the first subset comprises reference samples located to the left and/or left-below the block to be reconstructed, and the second subset comprises reference samples located above and/or above-right the block to be reconstructed.

In a fifth exemplary embodiment, which is a more detailed implementation of the third or fourth embodiment, there is also a diagonal mode for intra-prediction. In this method determination of the prediction mode that has been employed for encoding the block to be reconstructed comprises determining whether the intra-prediction is according to a vertical mode, a horizontal mode, or an angular mode, and in case the intra-prediction is according to the diagonal mode, all reference samples are subjected to pre-prediction filtering.

In a sixth exemplary embodiment, which is a more detailed implementation of one of the first to fifth embodiment, the second subset comprises reference samples of one or more blocks for which no residual has been coded in the encoded video stream, and the block is reconstructed by prediction based on the reference samples including the filtered first subset of reference samples and filtered second subset of reference samples.

In a seventh exemplary embodiment, which is a more detailed implementation of one of the first to sixth embodiment, the method further comprises applying a deblocking filter to pre-prediction filtered reference samples of different decoded blocks, the pre-prediction filtered reference samples are reference samples at the boundaries between decoded blocks.

An eighth exemplary embodiment provides a further implementation of the above mentioned aspect of the embodiment of the application and provides another method for reconstructing blocks of image using prediction. This method comprises determining reference samples of one or more already decoded blocks to be used for predicting a block to be reconstructed, selecting a subset of the reference samples to which a filter is to be applied prior to prediction and performing a pre-prediction filtering of the selected reference samples of the subset, and reconstructing the block by prediction based on the reference samples including the filtered reference samples of the subset. In this method, the selection of the subset and the pre-prediction filtering of the reference samples of the subset are repeated prior to reconstruction of the block by prediction.

In a ninth exemplary embodiment, which is a more detailed implementation of the eighth embodiment, the filter parameters for filtering the reference samples of the subset differ in the repetitions of selecting of the subset and pre-prediction filtering.

In a tenth exemplary embodiment, which is a more detailed implementation of the eighth or ninth embodiment, the subsets selected in the different repetitions are distinct or overlapping.

In a eleventh exemplary embodiment, which is a more detailed implementation of one of the eighth to tenth embodiment, in one of the repetitions, the selected subset of reference samples comprises all reference samples.

In a twelfth exemplary embodiment, which is a more detailed implementation of one of the eighth to eleventh embodiment, there are three repetitions (or iterations) of pre-prediction filtering. The first two repetitions are performed on the original reference samples to obtain filtered reference samples, while the third repetition is performed on the filtered reference samples obtained in the first two repetitions.

In a thirteenth exemplary embodiment, which is a more detailed implementation of one of the eighth to twelfth embodiment, in a first repetition, the respective subset of reference samples is filtered based on the size of the block to be reconstructed and/or the prediction mode that has been employed for encoding the block to be reconstructed, in a second repetition, the respective subset of reference samples comprises reference samples of one or more blocks for which no residual has been coded in the encoded video stream, and in a third repetition, a deblocking filter is applied to the reference samples filtered in the first or second repetition, the filtered reference samples are reference samples at the boundaries between decoded blocks.

In a fourteenth exemplary embodiment, which is a more detailed implementation of one of the seventh and thirteenth embodiment, the method further comprises adding a decoded residual for the block to be decoded to the reconstructed block to obtain a decoded block, and applying an ILDF to the decoded block.

In a fifteenth exemplary embodiment, which is a more detailed implementation of one of the first to fourteenth embodiment, the reference samples form two one-dimensional arrays, one array comprising a column of samples of one or more decoded neighboring blocks to the left or right of the block to be decoded, and the other array comprising a row of samples of one or more decoded neighboring blocks on top or bottom of the block to be decoded.

In a sixteenth exemplary embodiment, which is a more detailed implementation of one of the eighth to fifteenth embodiment, wherein pre-prediction filtering comprises applying a smoothing filter to at least one subset of the reference samples.

In a seventeenth exemplary embodiment, which is a more detailed implementation of one of the first, second, and sixth to sixteenth embodiment, inter-prediction is used for reconstructing the block of pixels.

In an eighteenth exemplary embodiment, which is a more detailed implementation of the seventeenth embodiment, the reference samples define a two-dimensional reference area within one or more decoded blocks to be used for inter-prediction when reconstructing the block. Further, one of the subsets of reference samples subject to pre-prediction filtering comprises reference samples belonging to a decoded block for which a residual was encoded in the encoded video stream.

In a nineteenth exemplary embodiment, which is a more detailed implementation of the seventeenth embodiment, the reference samples define a two-dimensional reference area within one or more decoded blocks to be used for inter-prediction when reconstructing the block. In this method the determination of the subsets of reference samples to which a filter is to be applied prior to inter-prediction comprises determining multiple distinct subsets of reference samples based on the result of performing an edge detection on the reference samples of the two-dimensional reference area. Further, pre-prediction filtering comprises filtering the reference samples of the subsets using different filter parameters.

In a twentieth exemplary embodiment, which is a more detailed implementation of the seventeenth embodiment, wherein multi-reference inter-prediction is used for reconstructing the block, and the reference samples define a stack of two-dimensional reference areas from the different reference frames to be used for inter-prediction when reconstructing the block. In this method, the determination of the subsets of reference samples to which a filter is to be applied prior to prediction comprises determining multiple distinct subsets of reference samples within the stack of two-dimensional reference areas based on the result of performing an edge detection on the reference samples, and pre-prediction filtering comprises filtering the reference samples of the subsets using different filter parameters.

In addition, reconstructing the block comprises predicting the block by calculating a weighted sum of filtered reference samples from the stack of two-dimensional reference areas.

A twenty first exemplary embodiment provides another implementation of the above mentioned aspect and relates to an apparatus for reconstructing blocks of an image using prediction. The apparatus comprises a reference sample buffer for storing one or more already decoded blocks to be used for predicting a block to be reconstructed. A processing unit configured to select a first subset of the reference samples and a second subset of the reference samples from the reference sample buffer. A filter unit configured to perform a pre-prediction filtering of the selected reference samples of the first subset and the second subset, wherein the filter parameters for filtering the reference samples of the first subset differ from the filter parameters for filtering the reference samples of the second subset, and a prediction unit configured to reconstruct the block by prediction based on the reference samples including the pre-prediction filtered reference samples of the first subset and the second subset.

In a twenty second exemplary embodiment, which is a more detailed implementation of the twenty first embodiment, the processing unit is configured to determine the size of the block to be reconstructed and/or the prediction mode that has been employed for encoding the block to be reconstructed, and the processing unit is further configured to the determine the first and/or second subset of reference samples and/or selecting parameters for the pre-prediction filtering is based on the size and/or the prediction mode.

In a twenty third exemplary embodiment, which is a more detailed implementation of the twenty first or twenty second embodiment, intra-prediction is used for reconstructing the block, and the processing unit is configured to determine whether the intra-prediction is according to a vertical mode, a horizontal mode, or an angular mode. The processing unit is configured to cause the filter unit to apply pre-prediction filtering to reference samples of the first subset and the second subset, in case the intra-prediction is according to another angular mode. Further, the processing unit is configured to cause the filter unit to apply pre-prediction filtering to reference samples located to the left and/or left-below the block to be reconstructed, in case the intra-prediction is according to the vertical mode. Moreover, the processing unit is configured to cause the filter unit to apply pre-prediction filtering to reference samples located above and/or above-right the block to be reconstructed, in case the intra-prediction is according to the horizontal mode.

In a twenty fourth embodiment, which is a more detailed implementation of the twenty third embodiment, the first subset comprises reference samples located to the left and/or left-below the block to be reconstructed, and the second subset comprises reference samples located above and/or above-right the block to be reconstructed.

In a twenty fifth exemplary embodiment, which is a more detailed implementation of the twenty third or twenty fourth embodiment, the processing unit is configured to determine whether the intra-prediction is according to a vertical mode, a horizontal mode, or an angular mode. The processing unit is configured to cause the filter unit to apply pre-prediction filtering to all reference samples, in case the intra-prediction is according to the diagonal mode.

In a twenty sixth exemplary embodiment, which is a more detailed implementation of one of the twenty first to twenty fifth embodiment, the second subset comprises reference samples of one or more blocks for which no residual has been coded in the encoded video stream, and the prediction unit is configured to reconstruct the block based on the reference samples including the filtered first subset of reference samples and filtered second subset of reference samples.

In a twenty seventh exemplary embodiment, which is a more detailed implementation of one of the twenty first to twenty sixth embodiment, the apparatus comprises a deblocking filter configured to perform a deblocking of the pre-prediction filtered reference samples of different decoded blocks prior to prediction. The pre-prediction filtered reference samples are reference samples at the boundaries between decoded blocks.

A twenty eighth exemplary embodiment provides another implementation of the above mentioned aspect and relates to an apparatus for reconstructing blocks of an image using prediction. The apparatus comprises a reference sample buffer for storing one or more already decoded blocks to be used for predicting a block to be reconstructed, a processing unit configured to select a subset of the reference samples to which a filter is to be applied prior to prediction, a filter unit adapted to perform a pre-prediction filtering of the selected reference samples of the subset, and a prediction unit configured to reconstruct the block by prediction based on the reference samples including the filtered reference samples of the subset. The processing unit and the filter unit are configured to repeat selecting of the subset and the pre-prediction filtering of the reference samples of the subset prior to reconstruction of the block by prediction.

In a twenty ninth exemplary embodiment, which is a more detailed implementation of the twenty eighth embodiment, the filter unit is configured to use different parameters for filtering the reference samples of the subset in the repetitions.

In a thirtieth exemplary embodiment, which is a more detailed implementation of the twenty eighth or twenty ninth embodiment, the processing unit is configured to select, in the different repetitions, subsets which are distinct or overlapping.

In a thirty first exemplary embodiment, which is a more detailed implementation of one of the twenty eighth to thirtieth embodiment, in one of the repetitions (which could also be referred to as iterations), the selected subset of reference samples comprises all reference samples.

In a thirty second exemplary embodiment, which is a more detailed implementation of one of the twenty eighth to thirty first embodiment, there are three repetitions (or iteration). The processing unit and the filter unit are configured to perform the first two repetitions the original reference samples to obtain filtered reference samples, and to perform the third repetition on the filtered reference samples obtained in the first two repetitions.

In a thirty third exemplary embodiment, which is a more detailed implementation of one of the twenty eighth to thirty second embodiment, in a first repetition, the filter unit filters the respective subset of reference samples based on the size of the block to be reconstructed and/or the prediction mode that has been employed for encoding the block to be reconstructed. In a second repetition, the respective subset of reference samples comprises reference samples of one or more blocks for which no residual has been coded in the encoded video stream. Finally, in a third repetition, the filter unit applies a deblocking filter to the reference samples filtered in the first or second repetition, the filtered reference samples are reference samples at the boundaries between decoded blocks.

In a thirty fourth exemplary embodiment, which is a more detailed implementation of one of the twenty seventh or thirty third embodiment, the apparatus further comprises a summation unit configured to add a decoded residual for the block to be decoded to the reconstructed block to obtain a decoded block, and an ILDF configured to apply deblocking to the decoded block.

In a thirty fifth exemplary embodiment, which is a more detailed implementation of one of the twenty first to thirty fourth embodiment, the filter unit is configured to apply a smoothing filter to at least one subset of the reference samples.

In a thirty sixth exemplary embodiment, which is a more detailed implementation of one of the twenty first to thirty fifth embodiment, the apparatus is an encoding apparatus for encoding images of a video, or a decoding apparatus for decoding encoded images of a video stream.

The above mentioned aspect and its implementation according to one of the different embodiments discussed herein may also be implemented on a computer-readable storage medium. Such medium may store instructions that, when executed by a processing unit, cause the processing unit to perform the method for reconstructing blocks of image using prediction according to one of the various embodiments described herein.

BRIEF DESCRIPTION OF DRAWINGS

In the following embodiments of the application are described in more detail in reference to the attached figures and drawings. Similar or corresponding details in the figures are marked with the same reference numerals.

DESCRIPTION OF EMBODIMENTS

The following paragraphs will describe various implementations and embodiments of the different aspects. As already noted above, one aspect of the embodiment of the application relates to pre-prediction filtering of reference samples that are to be used in predicting a block of an image, e.g. as part of an encoding or decoding process. The improvements to prediction techniques discussed herein are inter alia applicable to block-prediction using intra- or inter-prediction. The pre-prediction techniques to reduce noise influence on the predicted samples of a block to be reconstructed. Reference samples (which could be also referred to respective values of the pixels of the given block of an image) that are used to reconstruct a given block of pixels of an image are categorized or segmented into subsets. The subsets may be processed differently, e.g. the subsets may be subjected to distinct filters. Examples of such filters include smoothing filters and/or deblocking filters, which are applied to the respective In the following embodiments, reference is mainly made to intra-prediction of a block of pixels of an image based on reference samples of other blocks, which have been already decoded in advance. However, it should be apparent that the principles discussed herein can also be applied to inter-prediction.

Figure 1:
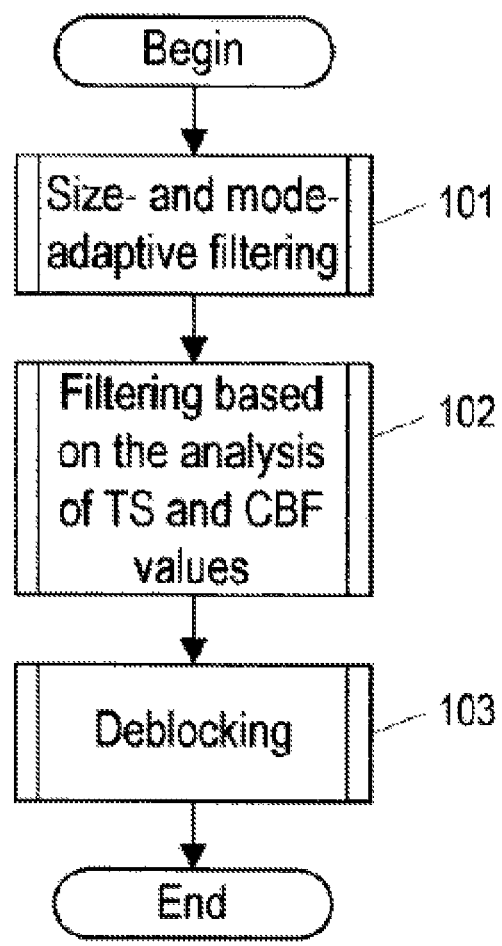
FIG. 1 shows an exemplary flow-chart of a pre-prediction filtering for use in intra-prediction of a block to be decoded, according to an exemplary embodiment of the application.
Figure 5:
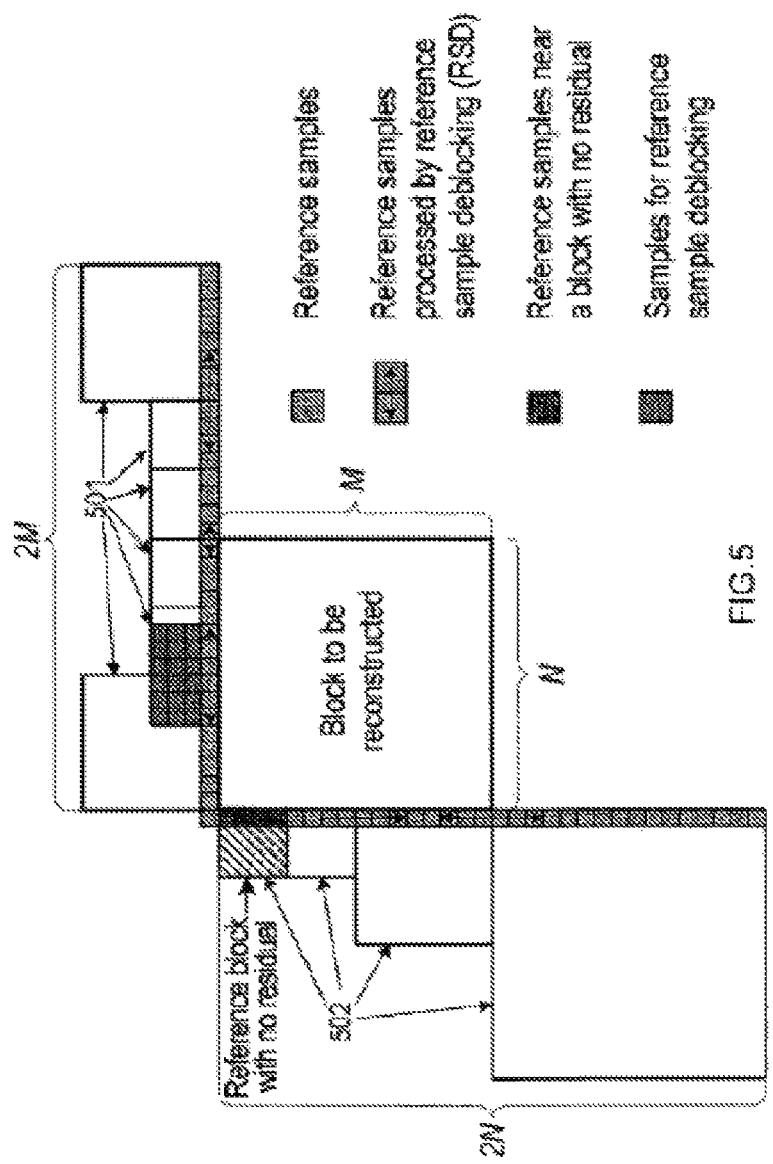
FIG. 5 exemplifies the reference samples for reconstructing a given block of pixels according to an embodiment of the application, and the processing of the reference samples according to steps 102 and 103 of the pre-prediction filtering of FIG. 1.

FIG. 1 shows a flow chart that exemplifies the pre-prediction filtering steps according to an exemplary embodiment of the application. Here, a one-dimensional case of processing reference samples for intra-prediction is assumed. Typically, but not limited thereto, the reference samples (values of pixels) for a block to be reconstructed are taken from neighboring blocks to the left (and left-bottom) and top (and top-right) relative to the block to be reconstructed. The number of blocks from which the reference samples are taken depends for example on the size of the block to be reconstructed as well as the size of the neighboring blocks. For example, the reference samples could be the samples (pixel values) of the rightmost column in the neighboring left block(s) and the samples (pixel values) of the bottom row in the neighboring block(s) above (on top of) the block to be reconstructed, as exemplified in FIG. 3. The reference samples may be for example be provided in a reference sample buffer and the prediction unit predicts the block based on the samples stored in the prediction buffer. The number of reference blocks and reference samples needed for predicting a current block (e.g. a TU in H.265 video coding) may depend on the size N×M of the current block. One may assume for exemplary proposes—as shown in FIG. 5—that in the vertical direction, reference samples are taken from all blocks 502 to the left and left bottom in the range 2N relative to the upper left corner of the current block, and in horizontal direction, reference samples are taken from all blocks 501 above and above right in the range 2M relative to the upper left corner of the current block. Further, M may also be equal to N.

It can be assumed for exemplary purposes that at the beginning of the pre-prediction filtering, the decoded reference samples for reconstructing a given block are provided in a reference sample buffer of an encoding or decoding apparatus and can be accessed in steps 101, 102 and 103 shown in FIG. 1. Note that one of steps 101 and 102 is optional such that steps 101 and 103 are performed, steps 102 and 103 are performed, or all steps 101, 102 and 103 are performed.

Step 101 of the reference sample processing is a size- and mode-dependent filtering which will be discussed in connection with FIG. 2 below in further detail. Step 102 is a special processing of reference samples that are taken from decoded blocks for which no residual signal is encoded in the video bit stream, which involves filtering based on the analysis of transform skip (TS) and code block flag (CBF) values. Step 103 is a deblocking filter, which is applied to the reference samples on the block boundaries of the reference blocks. While steps 101 and 102 operate on the original ("unmodified") reference samples, step 103 uses the processed reference samples obtained in step 101 and/or step 102.

Figure 2:
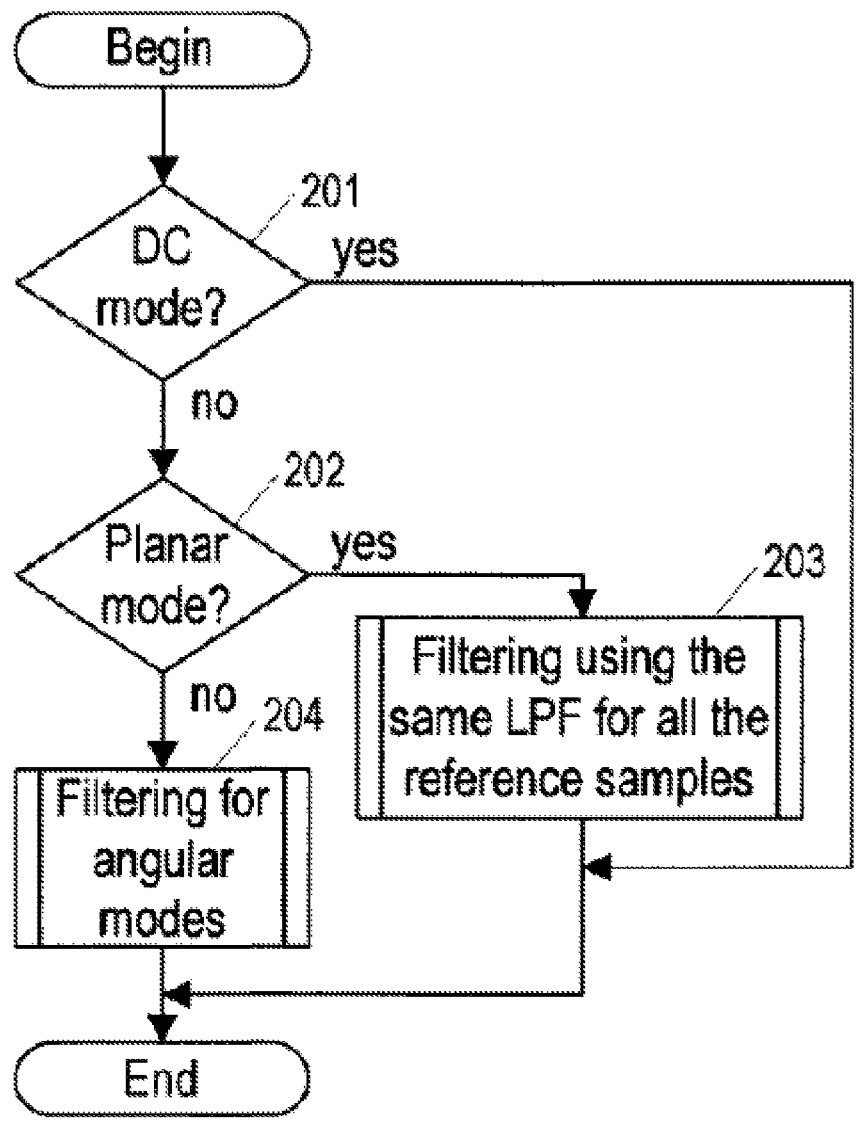
FIG. 2 shows a flow-chart of an exemplary implementation of size- and mode-dependent pre-prediction filtering in FIG. 1.

FIG. 2 shows an exemplary flow-chart for the overall processing of the block upon reconstruction by means of prediction depending on its prediction mode. For example, when applying the embodiment of the application to H.265 video coding, there may be 35 intra-prediction modes, and 33 of them are angular prediction modes (including diagonal, vertical, horizontal and "true" angular modes). The angle of intra-prediction depends on the index $N_{am}$ of an angular mode. This dependency is linear, i.e. a higher value of mode index $N_{am}$ indicates a greater value of the prediction angle. For the sake of generality, minimal and maximum angular mode indexes are denoted by $N_{min}$ and $N_{max}$ respectively. In the particular case of the HEVC/H.265 standard, $N_{min}=2$ and $N_{min}=34$, while $N_{am}=0$ indicates a planar mode and $N_{am}=1$ indicates a direct current (DC) mode. In planar mode predicted pixels are calculated as a sum of two bilinear interpolations, horizontal and vertical ones. Predicted pixels are equal to the average value of reference pixels when DC prediction mode is selected. However, for DC intra prediction of blocks having size less than 32 pixels, first column and first row of a predicted block are calculated as a weighted sum of corresponding reference pixels and the average value of these reference pixels.

As shown in FIG. 2, first it is checked whether a given block has been predicted using DC mode in step 201 (e.g. by checking, whether $N_{am}=1$), and if this is the case, no pre-prediction filtering may be applied. Next, it is checked whether the block has been predicted using the planar mode in step 202 (e.g. by checking whether $N_{am}=0$). If the planar mode is used, in step 203, all reference samples may be subjected to one filter, e.g. a smoothing filter, such as a low-pass filter (LPF).

If the processing of the block to be reconstructed is neither DC mode nor planar mode, an angular mode intra-prediction has been used for the given block. The processing (filtering) of a block subjected to angular mode intra-prediction in step 204, according to an exemplary embodiment of the application, and it is shown in the flow-chart of FIG. 3.

As indicated above, the mode index $N_{am}$ may indicate several special directions that could be selected from these angular modes, horizontal, vertical and diagonal ones. Each of these directions has a set of nominal mode indices $N_{am}^{nom}$ associated with them. For example, the diagonal modes may be associated with the mode indices $N_{am}^{nom}=\{2, 18, 34\}$, the vertical mode may be associated with the mode index $N_{am}^{nom}=26$, and the horizontal mode be associated with the mode index $N_{am}^{nom}=10$. However, these exemplary indices are not intended to be limiting.

To check if a given input mode index $N_{am}$ belongs to a specific direction a special range Ram may be specified. The range Ram may be determined based on the block size $S_{TU}$ of the block to be reconstructed. For example, for larger blocks larger range values could be used. The check whether $N_{am}$ belongs to a specific direction (defined by $N_{am}^{nom}$ and $R_{am}$) could be written as follows:

$$\max\{N_{am}^{min}(N_{am}^{nom}, S_{TU}), N_{min}\} \le N_{am} \le \min\{N_{am}^{max}(N_{am}^{nom}, S_{TU}), N_{max}\},$$

$$N_{am}^{max}(N_{am}^{nom}, S_{TU}) = N_{am}^{nom} + R_{am}(S_{TU})$$

$$N_{am}^{min}(N_{am}^{nom}, S_{TU}) = N_{am}^{nom} - R_{am}(S_{TU}).$$

Figure 3:
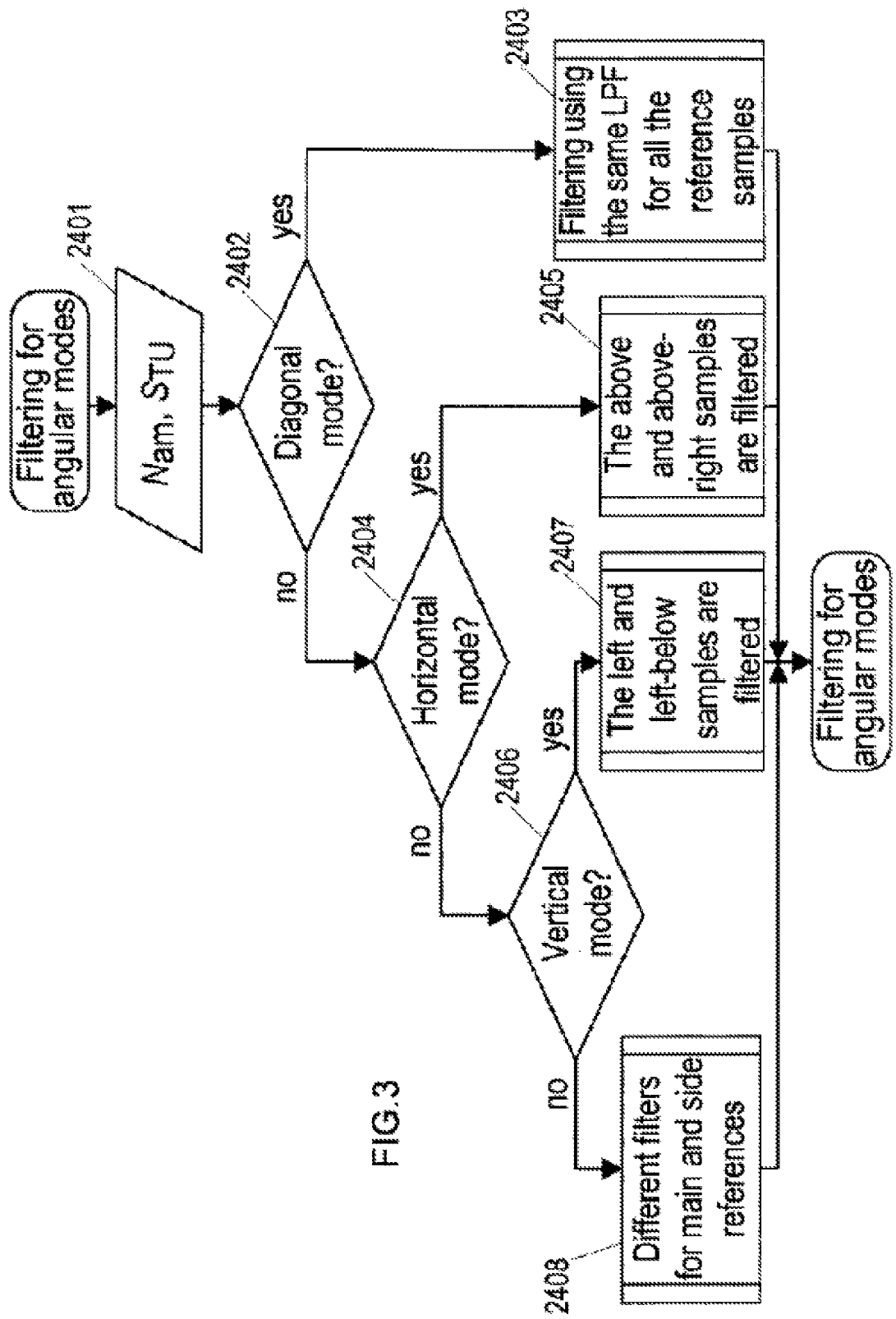
FIG. 3 shows a flow-chart of an exemplary implementation of the processing of reference samples for angular prediction modes in the size- and mode-dependent pre-prediction filtering of FIG. 2.

The exemplary flow chart of size- and mode-adaptive filtering performed in step 204 for different angular modes is shown in FIG. 3. The angular intra-prediction modes available in this exemplary embodiment are diagonal mode, vertical mode, horizontal mode, and another angular mode.

In step 2401, the mode index $N_{am}$ and the block size $S_{TU}$ of the block to be reconstructed are obtained to determine the case of angular intra prediction: vertical, horizontal, diagonal or arbitrary one. In diagonal mode, in step 2402, the prediction of the samples of a block is based on reference samples taken from the neighboring left (and optionally left bottom) and top blocks (and optionally top right). In vertical mode, the prediction of the samples of a block is based on reference samples taken from neighboring reference block(s) on top/above (and optionally top/above right) of the block to be reconstructed. When check whether the mode is diagonal, and if diagonal intra-prediction case occurs, mode index $N_{am}$ and the block size $S_{TU}$ yields a diagonal case of intra-prediction, that could be determined, e.g. by checking whether $N_{am}^{nom}=\{2, 18, 34\}$. In that case all reference samples are subjected to a filter in step 2403 (case D for the table shown below), e.g. a smoothing filter, such as an LPF.

If the mode is not diagonal mode, it is checked in step 2404 whether the intra-prediction mode is the horizontal mode, in which the prediction of the samples of a block is based on reference samples taken from neighboring reference block(s) above (and optionally above right) of the block to be reconstructed. The reference samples of the above and above right (if present) block(s) are filtered in step 2405 (case C for the table shown below) if the horizontal mode intra-prediction is used, and it is check whether the vertical mode is used in step 2406 if the horizontal mode intra-prediction is not used. The reference samples of the left and left bottom (if present) block(s) are filtered in step 2407 (case B for the table shown below) if the vertical mode intra-prediction is used.

Figure 4:
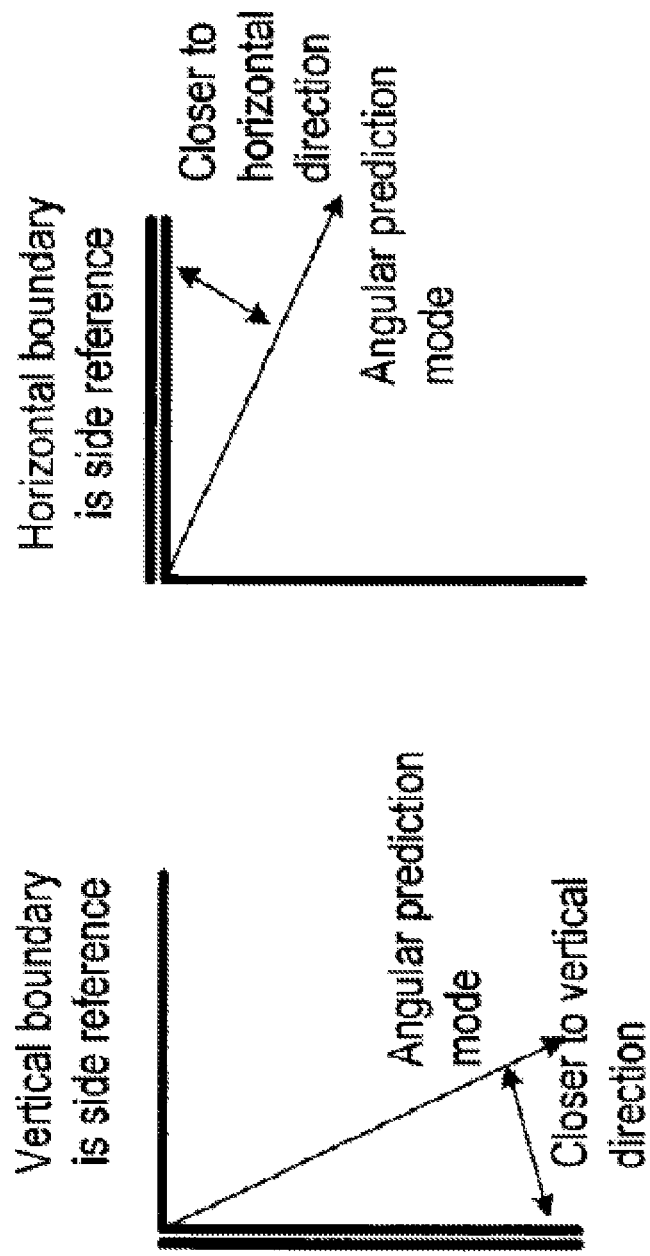
FIG. 4 exemplifies main and side reference samples for different angular prediction modes.

Arbitrary angular prediction case occurs when mode index $N_{am}$ does not determine horizontal, vertical or diagonal cases as described above (see FIG. 4). In that case if mode index $N_{am}$ is yielding more towards the horizontal direction, the reference samples of the neighboring block(s) to the left (and left bottom) of the block to be reconstructed are forming a first subset (main reference samples) and the reference samples of the neighboring block(s) above (and above right) of the block to be reconstructed are forming a second subset (side reference samples). The main reference samples and side reference samples are subjected to different filters (case A for the table shown below) in step 2408, for example smoothing filters such as an LPF—i.e. the filter parameters of the two filters are different from each other. When mode index $N_{am}$ is yielding more towards the vertical direction, main and side reference samples correspond to second and first subsets accordingly.

In any of the above discussed cases, the filtered reference samples may be stored in the reference sample buffer for use in step 103 (or update in step 102).

The table below exemplary illustrates an exemplary filter configuration for the mode- and size-dependent pre-prediction filtering the reference samples according to FIG. 3. Letters in the table's header indicate a variant (case A, B, C, D) described in connection with FIG. 3. The TU size indicates the size (N×N pixels) of the block to be reconstructed. Filter coefficients are given in square brackets are not normalized, i.e. each of them should be divided on the sum of the filter coefficients so that the sum of coefficients after their normalization should be equal to one. Filter coefficients specified as "[1]" indicate specific cases when no filtering should be applied.

| TU size: | A | B | C | D |
|---|---|---|---|---|
| 4x4 | | | No filtering [1] | |
| 8x8 | Same filter for both main and side reference: switch (filter_flag) { true: [1 2 1] false: [1] N/A: [1] } | Same filter for both main and side reference switch (filter_flag) { true: [1 2 1] false: [1] N/A: [1] } | | Same filter for both main and side reference switch (filter_flag) { true: [1 4 6 4 1] false: [1 2 1] N/A: [1 2 1] } |
| 16x16 | switch (filter_flag) { true: | | | |
| 32x32 | Main reference: [1 6 1] Side reference: [2 3 6 3 2] false: [1] N/A: [1] } | | | |

As can be seen from the table, the filtering of the reference samples depends on their intra-prediction mode and the size of the block to be reconstructed.

It could be noticed that in the table above the value filter_flag is present. This value is signaled in a video bit stream and indicates additional variants of filter selection specified by the above-described table. The signaling of this flag could be performed either explicitly or implicitly. Implicit signaling could be implemented using data hiding techniques, e.g. similar to Sign Data Hiding described in Gordon Clare, Félix Henry, Joël Jung, "Sign Data Hiding", Orange Lab's contribution to JCT-VC meeting, JCTVC-G273, Geneva, November 2011, which is incorporated herein for reference.

Next, steps 102 and 103 as shown in FIG. 1 will be described in further detail. The processing in steps 102 and 103 is exemplified using FIG. 5, which shows the reconstruction of a block using reference samples from neighboring (already decoded) blocks. As shown in FIG. 5 it is assumed that the block to be reconstructed has a size N×M pixels (M may also be equal to N). In the vertical direction, the reference samples are taken from all blocks 502 to the left and left bottom in the range 2N relative to the upper left corner of the current block (here they form the rightmost column of pixels of the blocks 502). In the horizontal direction, reference samples are taken from all blocks 501 above and above right in the range 2M relative to the upper left corner of the current block (here they form the lowest row of pixels of the blocks 501). FIG. 5 thus assumes a diagonal or angular mode intra-prediction other than horizontal mode or vertical mode (where there would be either reference samples from only blocks 502 or blocks 501, respectively).

In one implementation of steps 102 and 103 set of reference samples is divided into several subsets according to the configuration of neighbor blocks and presence of residuals in them. In one exemplary example implementation of step 102, it is checked whether the reference samples are from a block for which no residual is coded in the video stream. In the H.265 the presence of residual signal could be determined using values of two flags:

transform skip flag ($T_{Sk}$), where it indicates whether residual coding was skipped on the encoder side for of a color component being processed. $T_{Sk}$ equal to 1 means that residuals should not be processed and hence, bit stream does not contain quantized transform coefficients.

cbf_luma, cbf_ch or cbf_cr flags, where if a flag is equal to zero, it means that for the specified color component of a given block quantization of transformed residual did not provide any non-zero quantized transform coefficient. $CBF_k$ denote one of these flags depending on a color component being processed.

As those blocks are reconstructed from prediction only, but no residual signal is added, the noise in the reconstructed block (and thus the reference samples from this block) is reduced, as no quantization noise (which would be present in a residual signal) is added such that the reference samples are smoother. Therefore, according to one example implementation, the (unmodified) reference samples from reference blocks that are reconstructed without a residual signal are filtered by applying another, "weaker" filter than that/those used for pre-prediction filtering of reference samples in step 101 (note that "unmodified" intends to express that the filtering in step 102 is performed on the original reference samples, and not the filtered reference samples of step 101). Applying a weaker filter means distorting input signal lesser, i.e. the weaker filtering is the smaller is the value of mean squared difference between input and output signals. For example, the filter coefficients for filtering the reference samples of reference block not having a residual signal in comparison with those used in the step 101 of FIG. 1 are different. Making reference to the table above again and considering the case A, the filter coefficient array [2 3 6 3 2] in step 101 for filtering the main reference samples could be replaced by the filter coefficients [1 2 1] in step 102, and instead of the [1 6 1] filter of step 101, the side reference samples are not filtered. The latter change of coefficients could be also expressed in a form of [1] filtering. The processing of reference samples according to step 102 may depend on the size $S_{TU}$ of the block to be reconstructed and the direction of angular prediction. For example, in one exemplary implementation, step 102 may only be performed for blocks larger or equal to 16×16 pixels and/or only in the case the intra-prediction mode is not horizontal mode, vertical mode or diagonal mode.

Figure 7:
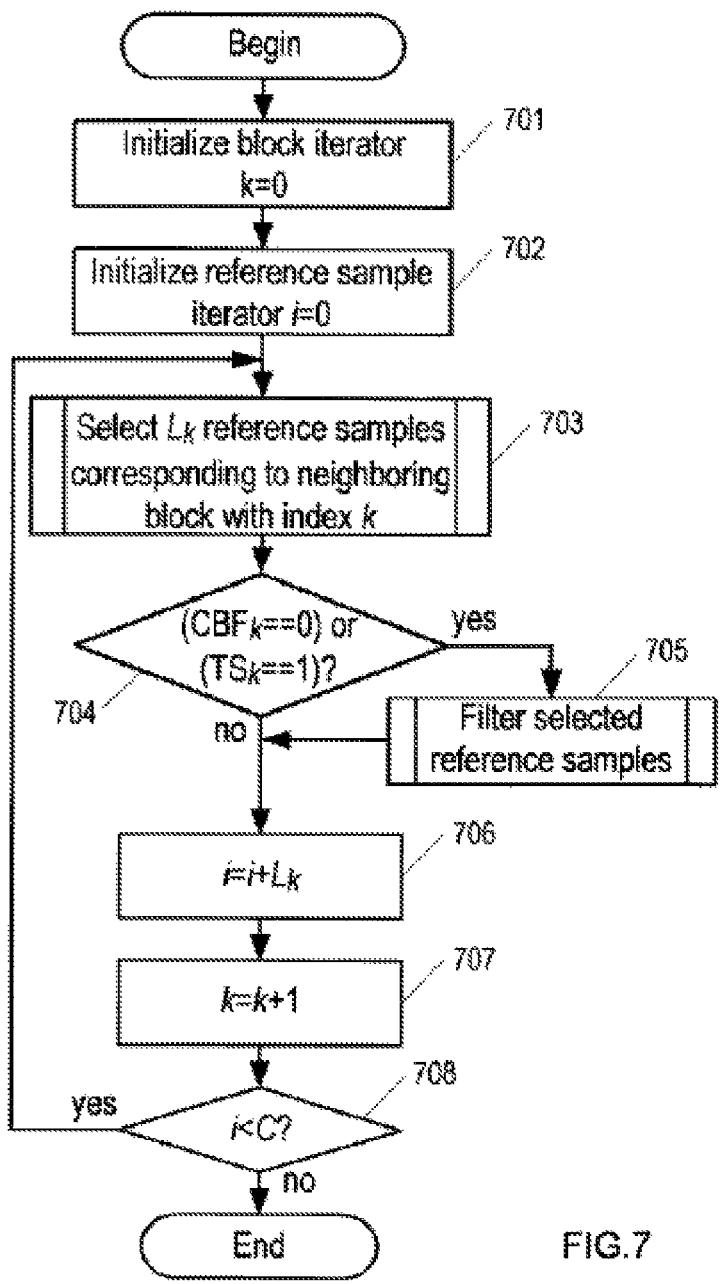
FIG. 7 shows a flow-chart of the processing of the reference samples according to step 102 of FIG. 1 according to an exemplary embodiment of the application.

FIG. 7 shows an exemplary flow chart of the filtering in step 102, where reference samples of blocks which have not residual signal are filtered prior to prediction in an iterative process. The block index (iterator) k and the reference sample index (iterator) i are initialized in step 701, and in step 702 to zero. The process selects $L_k$ reference samples of the next neighboring block with index k in step 703, and checks in step 704 for this block, whether this block with index k has a residual signal or not. If the block with index k has a residual signal, the process proceeds with step 706.

If the block with index k has no residual signal, then the process proceeds with step 705, where the $L_k$ reference samples of the next neighboring block with index k are subjected to a filter, e.g. a smoothing filter, such as an LPF. Note that here no further restrictions as to block size are considered, but of course such parameter could be also checked as a criterion for filtering.

In steps 706 and 707, the reference sample index i is incremented by $L_k$ and the counter variable k is incremented by one to select the next neighboring block. The processing is terminated when reference sample index i exceeds total number of reference samples C in step 708. The reference samples filtered in step 705 may be stored in a reference sample buffer for later use in prediction. Note that in case steps 101 and 102 are both performed on the set of reference samples, the reference samples filtered in step 705 are overwriting the corresponding reference samples in the reference sample buffer.

Figure 6:
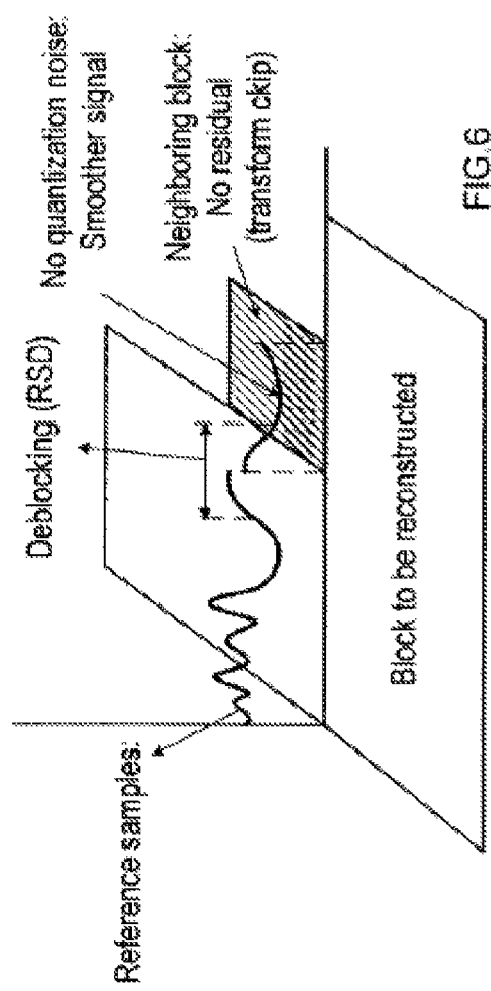
FIG. 6 exemplifies the reference samples processing according to an embodiment of the application for the processing of the reference samples according to step 102 of FIG. 1.

In step 103, a deblocking filter may be applied to the reference samples in the reference sample buffer which have been subjected to filtering in steps 101 and/or 102 before. This is also indicated in FIG. 5 by the blocks of reference samples having double arrows yielding the reference samples at the block boundaries on which the deblocking is performed (see also FIG. 6). The reference samples deblocking may reuse the same deblocking algorithms as used in known video encoding/decoding standards. For example, the deblocking algorithm for reference sample deblocking may be the one used during in-loop filtering of the H.265 video coding standard. However, during reference sample deblocking (RSD) process, deblocking parameters ($\beta$ and $t_c$) should differ from the ones used by in-loop deblocking. The new deblocking parameters for the RSD filter could be derived, for instance, using offsets ($\Delta_{QP}$, $\Delta\beta$ and $\Delta t_c$) with respect to the following equations:

$$\beta_{modif} = \beta(QP+\Delta_{QP})+\Delta\beta, \text{ and}$$

$$t_{c\ modif} = t_c(QP+\Delta_{QP})+\Delta t_c.$$

The role of these offsets is to modify the dependencies of $\beta$ and $t_c$ over quantization parameter (QP). Introduction of offsets ($\Delta_{QP}$, $\Delta\beta$ and $\Delta t_c$) could be illustrated by a horizontal or vertical displacement of the dependencies' graphs. Horizontal displacement is controlled by $\Delta_{QP}$ value, and vertical displacements for $\beta$ and $t_c$ are determined by $\Delta\beta$ and $\Delta t_c$, respectively. The values of these offsets could be defined as constant values, or could be a functions of QP. The latter case could be implemented by in the form of a look-up table, i.e. for every QP value a three offset values $\{\Delta_{QP}, \Delta\beta, \Delta t_c\}$ could be defined.

Figure 8:
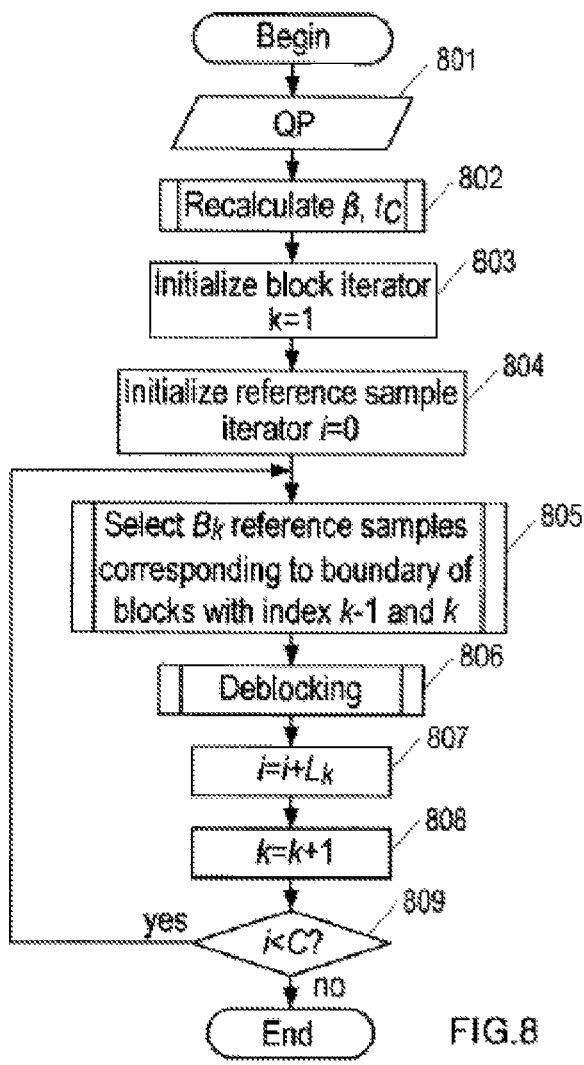
FIG. 8 shows a flow-chart of the processing of the reference samples according to step 103 of FIG. 1 according to an exemplary embodiment of the application.

An exemplary implementation of the deblocking process of step 103 is exemplified in the flow chart of FIG. 8. In step 801 the value of QP is obtained. Furthermore, in step 802, the deblocking parameters $\beta$ and $t_c$ are calculated as described above (i.e. $\beta_{modif}$ and $t_{c\ modif}$ are used for RSD) using previously defined quantization parameter. Similar to FIG. 7, the process of FIG. 8 then iterates through the blocks neighboring the block to be reconstructed and applies the deblocking filter to the samples at the boundaries of two adjacent reference blocks (as indicated in FIG. 5). Moreover, block index (iterator) k and the reference sample index (iterator) i are initialized in step 803, and in step 804 to one and zero, respectively. Next, Bk reference samples corresponding to the boundary of blocks with index k−1 and k are selected in step 805 and a deblocking filter is applied in step 806 to the selected Bk reference samples, as outlined above. In steps 807 and 808, the reference sample index i is incremented by the number Lk reference samples of the current block k and the block index k is incremented by one to select the next neighboring block. The processing is terminated when reference sample index i exceeds total number of reference samples C in step 809, similar to FIG. 7.

Figure 9:
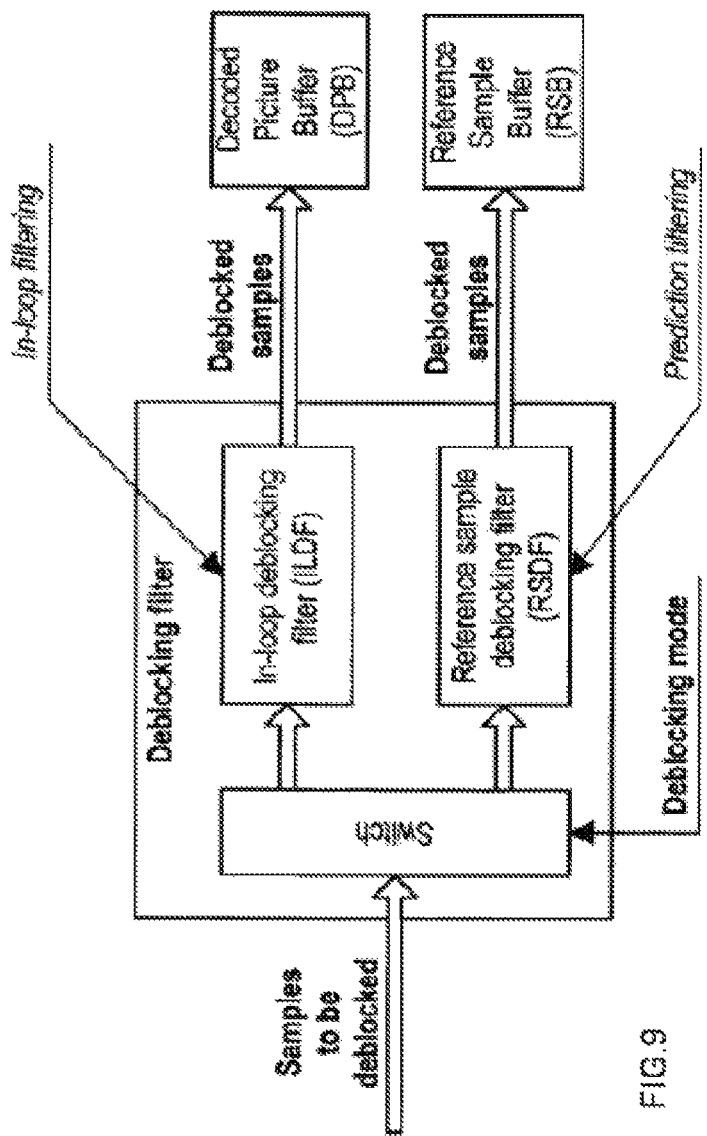
FIG. 9 shows an exemplary implementation of a deblocking filter according to an embodiment of the application.
Figure 19:
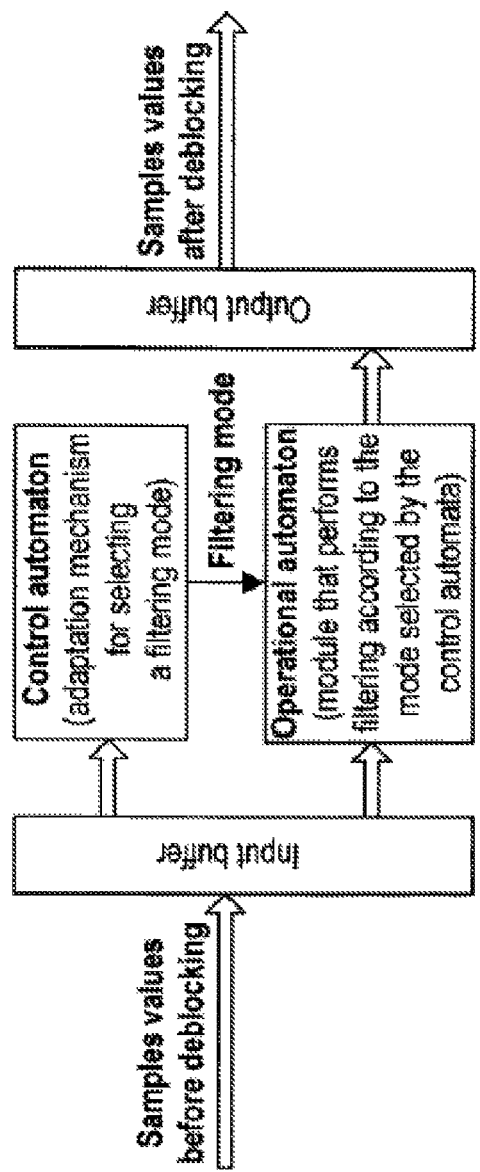
FIG. 19 shows another exemplary implementation of a deblocking filter according to an embodiment of the application.

In one advantageous implementation, the RSD and in-loop deblocking of the reconstructed image could use the same deblocking module in a video encoding or video decoding apparatus as exemplified in FIG. 9 or FIG. 19. The deblocking filter (module) receives a deblocking mode control signal which causes the switch to switch to ILDF operation or to reference sample deblocking filter (RSDF) operation. The deblocked samples are written either to the decoded picture buffer in case in-loop deblocking is performed, or to the reference sample buffer, in case reference sample deblocking is performed.

Figure 10:
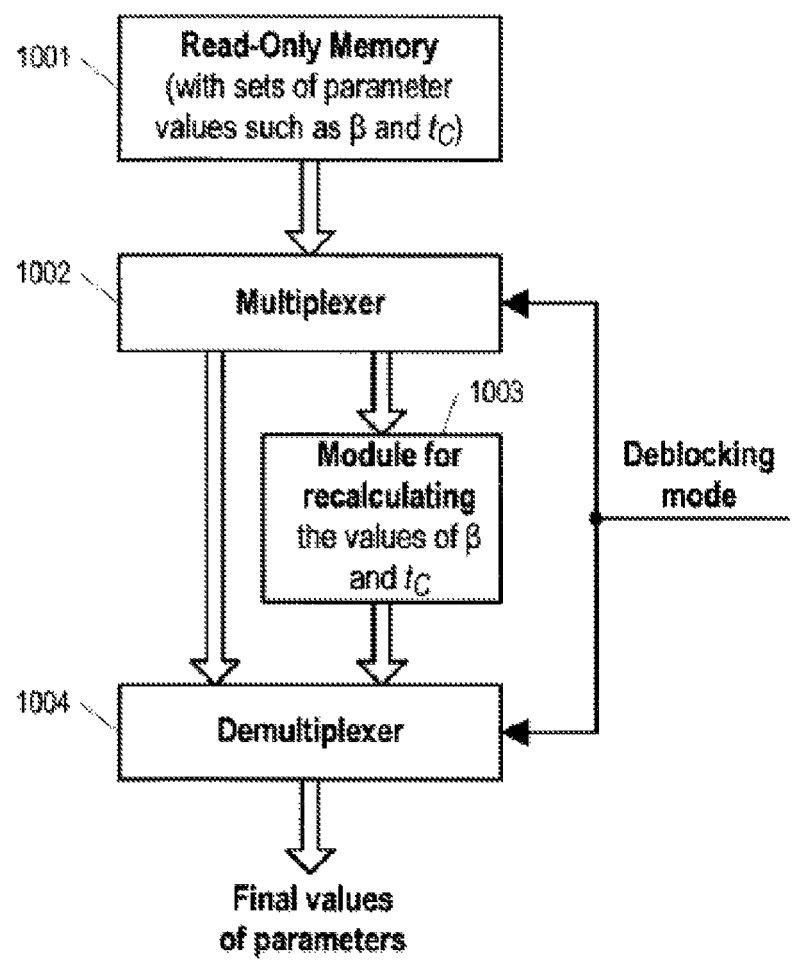
FIG. 10 shows an exemplary hardware structure for parameterizing a deblocking filter according to an embodiment of the application.

The data flow of such deblocking filter module according to FIG. 9 is exemplified in FIG. 10. A multiplexer 1002 could read the filter parameters for the deblocking from a read-only memory (ROM) 1001. The ROM 1001 could for example store the parameters β and $t_c$ according to the H.265 video coding standard. The multiplexer 1002 and demultiplexer 1004 are controlled by a deblocking mode control signal. If this signal indicates in-loop deblocking operation, the deblocking parameters β and $t_c$ are output from demultiplexer 1004 to the deblocking filter. If the deblocking mode control signal indicates reference sample filtering, the parameters β and $t_c$ are passed to recalculation module 1003, which calculates the modified deblocking parameters $β_{modif}$ and $t_{c\ modif}$ for RSD based on the parameters β and $t_c$. In this case the demultiplexer 1004 outputs the modified deblocking parameters $β_{modif}$ and $t_{c\ modif}$ to the deblocking filter. The recalculation module 1003 could be implemented by a special hardware module that adjusts parameter values stored in ROM 1001.

Figure 18:
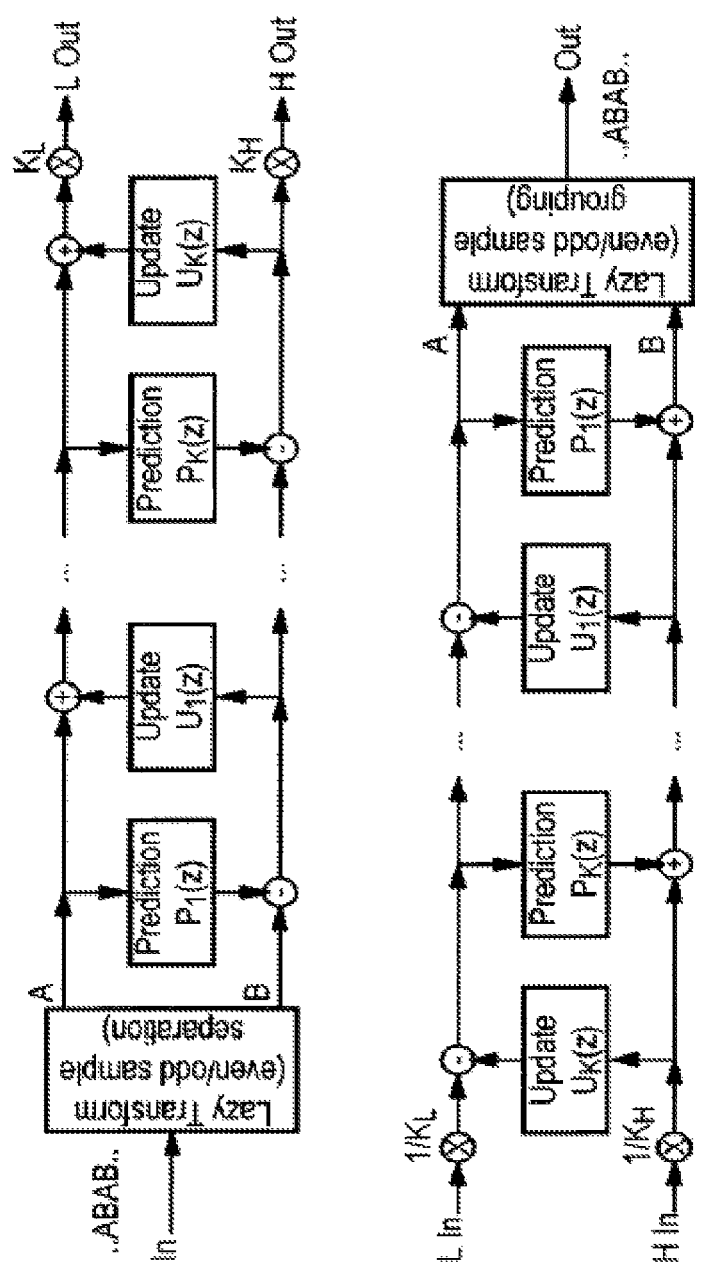
FIG. 18 shows a lifting process for MCTF.

An alternative implementation for an adaptive deblocking filter implementation is presented in FIG. 18. Decision making for deblocking is performed by the control automaton that defines a filtering mode. Operational automaton filters samples of the input buffer according to the filtering mode provided by control automaton. It is noteworthy that control and operational automata may use different samples of the input buffer.

Reference samples deblocking could be implemented as a modification of the in-loop deblocking process. Furthermore, the following modifications could be introduced: parameters of the control automaton, e.g., deblocking parameters β and $t_c$ as described above, control automaton logics, i.e. the procedure of operational automaton control, operational automaton logics, i.e. the procedure of samples processing, and all the above listed modifications.

Figure 11:
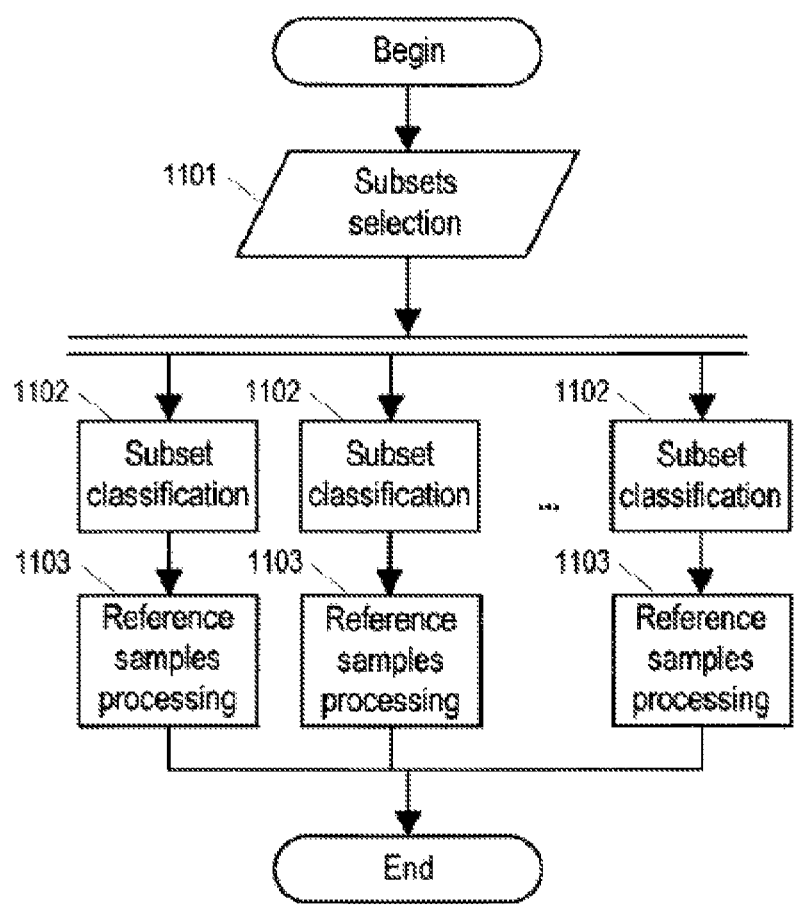
FIG. 11 exemplifies the parallel processing of subsets of reference samples according to an embodiment of the application.

Generally, the hardware implementation of pre-prediction filtering of individual subsets of reference samples could be iterative (as it is for example shown in FIGS. 7 and 8) or in parallel, as exemplified in FIG. 11 below. However, parallelization of the pre-prediction filtering using multiple threads as shown in FIG. 11 may only be possible for processing non-overlapping subsets. In essence, for parallel processing, the different subsets of the reference samples are selected in step 1101. Thereafter, each subset of reference samples can be processed in parallel to the other subsets in dedicated hardware. This processing may include a subset classification in step 1102 which defines what processing procedure should be applied to the samples of the subset and in step 1103 includes a subsequent processing/filtering of the reference samples of the given subset.

Another option to achieve an efficient hardware implementation of the pre-prediction filtering is pipelining where subset classification and reference sample processing steps may be processed with separate hardware modules. However, selection of the most suitable implementation strategy depends on a hardware platform and complexity of classification and processing operations.

The above-described embodiments were focused on intra-prediction with the use of one-dimensional reference samples. However, the above concepts for reference sample classification and pre-prediction filtering may be generalized to a two-dimensional case, as for example for motion prediction (inter-prediction). Motion prediction assigns an area of reference pixels for a block being predicted. This area is a two-dimensional array, i.e. a matrix of reconstructed pixel values. These values have the similar quantization noise issue as it was described for a one-dimensional case. Quantization noise may be distributed differently inside a reference area. This difference could be estimated on the encoder/decoder side, e.g. by classification of reference pixels using data on the presence of residual signal in the partitions obtained with quad-tree as showing in FIG. 12.

However also other ways of reference sample classification may be defined for a two-dimensional reference pixel matrix. In another exemplary implementation, the classification of the reference samples into subsets could be also based on edge detection techniques, which allows for a mechanism of content-adaptive reference pixels processing prior to inter-prediction. Edge detection technique could use, for example, Canny edge detector, Hough transform, Sobel and Prewitt filtering. An exemplary flow chart of such embodiment is shown in FIG. 13.

Figure 13:
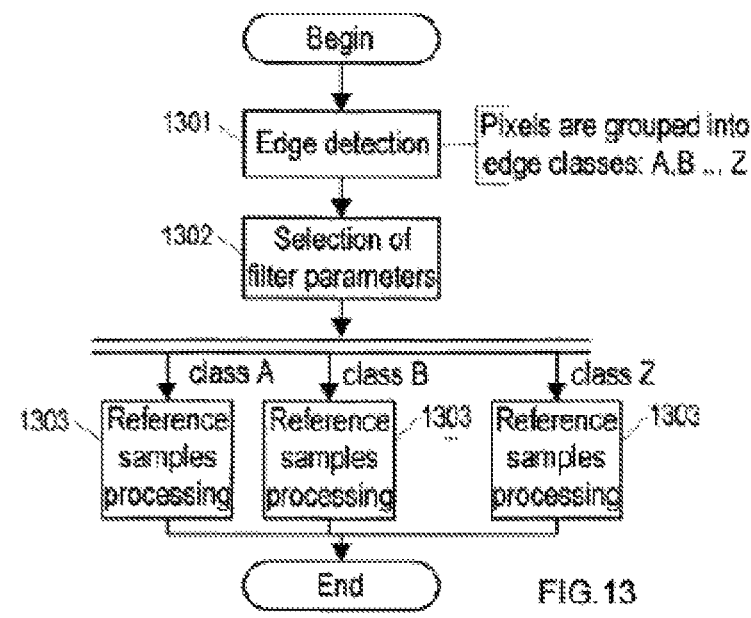
FIG. 13 exemplifies another parallel processing of subsets of reference samples according to an embodiment of the application, the subsets having been obtained for example by the classification of FIG. 12.

In FIG. 13, reference sample pixels are classified according to the edge detection process in step 1301. One of the possible ways to perform such a classification is to calculate local gradient values and apply quantization on them. Each reference pixel will be associated with its corresponding quantized value of local gradient, and hence it would be possible to segment all pixels into classes according to these quantized values. Every reference pixel class may be processed using its own set of parameters, e.g. filtering strength, blurring strength, direction of filtering, etc. Selection of these parameters could be performed locally, in step 1302, using statistics estimated separately for each of the classes. Noteworthy that reference samples processing step 1303 may be performed in parallel. Each of the processing branches is associated with its class, and hence should use its own set of parameters, that was obtained at the previous step.

Figure 12:
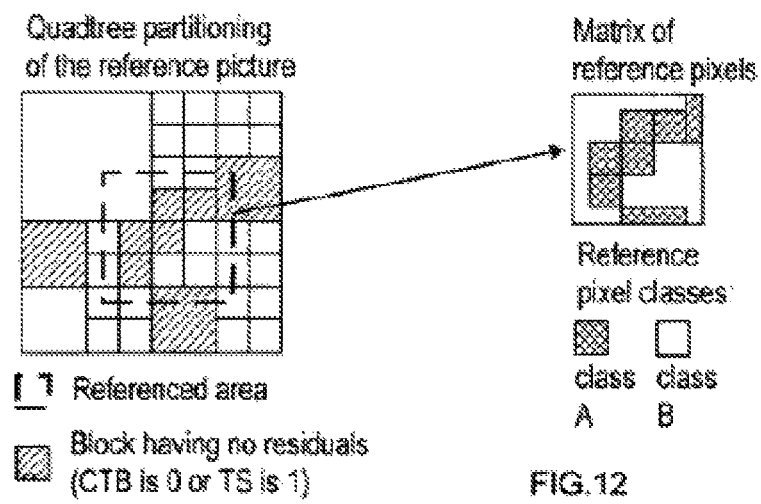
FIG. 12 shows an exemplary classification of reference samples in a two-dimensional area using an edge filter, according to an embodiment of the application.
Figure 14:
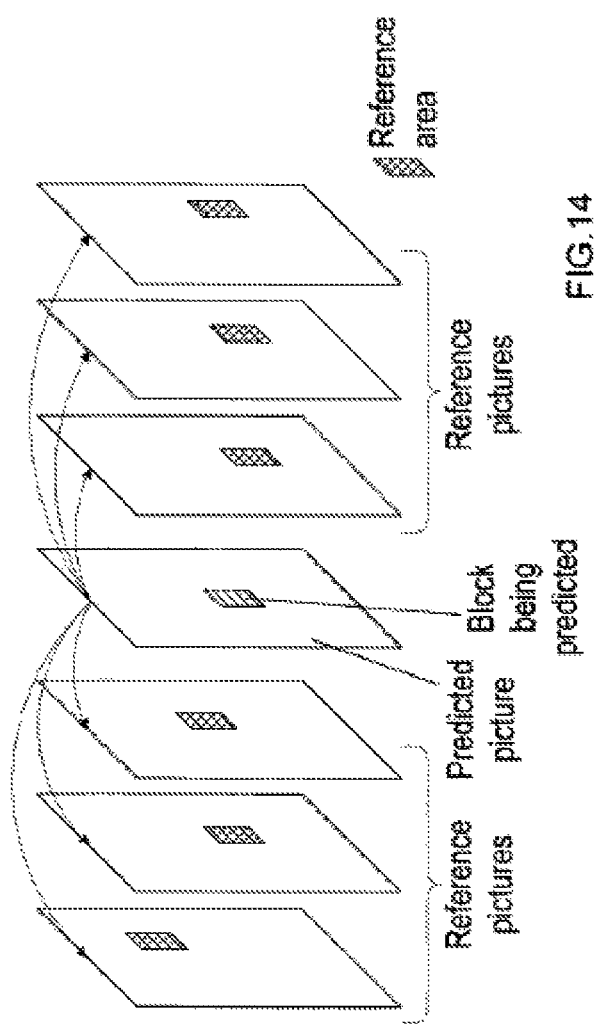
FIG. 14 exemplifies pre-prediction of a block based on reference samples in different images.
Figure 15:
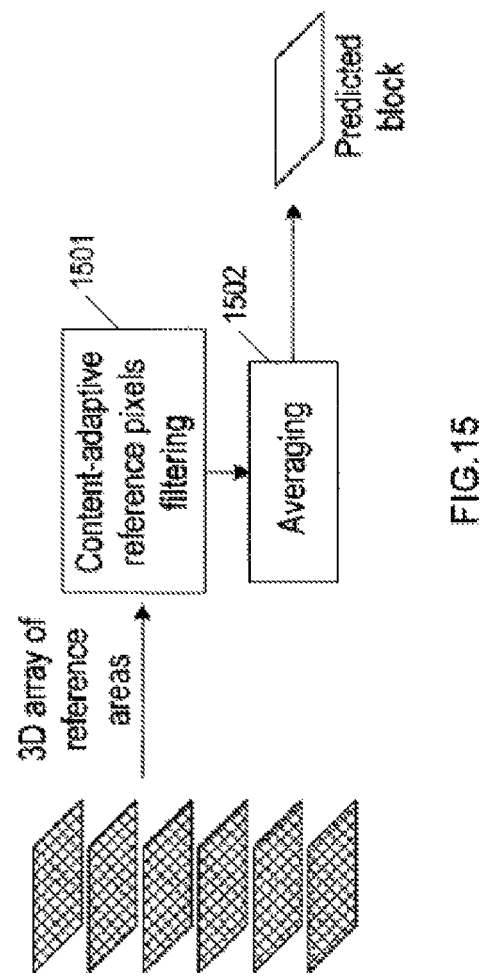
FIG. 15 shows an exemplary a flow-chart exemplifying the bi-prediction process according to an embodiment of the application.

The content-adaptive processing of FIGS. 12 and 13 may be also generalized to 3D reference pixel arrays, as for example used by multi-reference inter-prediction (e.g. bi-prediction). FIG. 14 shows an example of this type of inter-prediction. The block being predicted depends on several reference areas belonging to several reference pictures. A flow-chart exemplifying the bi-prediction process is shown in FIG. 15. Reference areas are stacked into a 3D array and are processed in step 1501 using content-adaptive reference pixels filtering. This operation has the same steps as presented in FIG. 13. However, edge detection and reference samples processing are performed for a 3D arrays in this case. Sets of pixels representing classes of reference samples have three dimensions as well.

The next step is to calculate predicted samples for the block being predicted. This task is performed at the stage of averaging in step 1502. Each of the predicted samples could be defined as the weighted sum of the corresponding samples of the filtered 3D array.

Another embodiment of the application relates to MCTF-based inter-frame coding. This lifting procedure described above and in FIG. 18 may be applied iteratively so that a pyramid representation could be achieved. The pre-prediction filtering of the reference samples could be used in the MCTF framework between iterations such that α and β could be adjusted according to the result of classification. Steps described in FIG. 13 could be used to obtain classes for a 3D pixel arrays composed of the H or L values calculated at the given iteration. However, reference sample processing step in this case could be described as one of the following alternative processes: adjustment of α and β, and filtering of L values before they are passed to the next lifting iteration.

Figure 16:
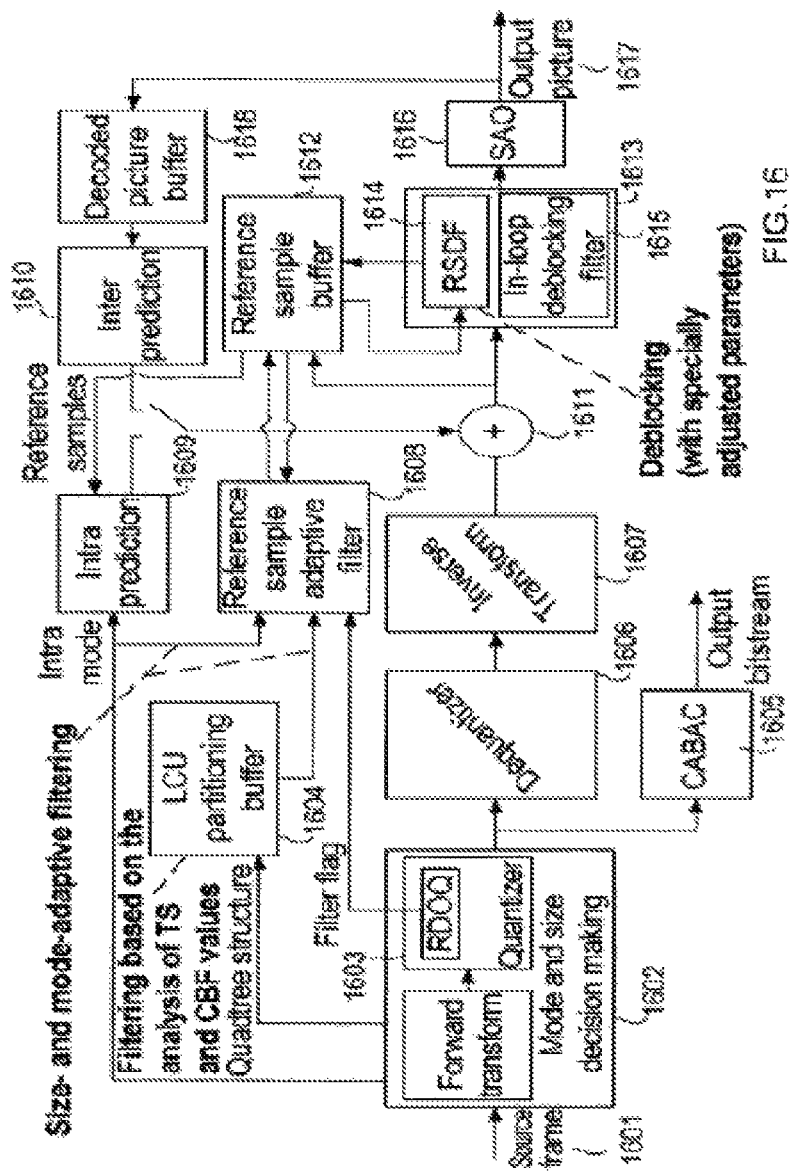
FIG. 16 shows a simplified block diagram of an example embodiment of an encoding apparatus according to an embodiment of the application.

FIG. 16 shows a simplified block diagram of an example embodiment of an encoding apparatus according to an exemplary embodiment of the application.

Source frame 1601 is divided into quadtree within the rate-distortion optimization (RDO) procedure 1602. This procedure selects the best prediction mode and size of blocks according to the rate-distortion cost (RD-cost). The cost is calculated as a sum of distortion and weighted rate. This procedure includes forward frequency transform of residual signal and RD-optimized quantization (RDOQ) of the transformed residual signal 1603. When calculating quantized values of transform coefficients, it is possible to implicitly signal a filter flag that would be further used by the reference samples adaptive filter (RSAF) 1608.

The partitioning of a source frame 1601 to a set of quadtrees is stored in a largest coding unit (LCU) partitioning buffer 1604 such that it is possible to restore configuration of a quadtree that was previously encoded.

Quantized coefficients produced by module 1602 are processed by context-adaptive binary arithmetic coder (CABAC) 1605 and written into output bitstream. Besides this operation, they are passed to dequantizer 1606 that prepares transform coefficients for further inverse transform 1607. Inverse transform 1607 generates restored residual signal which is further added in spatial domain with prediction signal by an adder 1611.

Prediction signal could be generated either by intra prediction 1609 or inter prediction 1610. Intra prediction 1609 uses reference samples stored in reference sample buffer 1612 to generate prediction signal. Inter prediction 1610 uses reference samples stored in decoded picture buffer 1618 for prediction signal generation.

Mode and size-dependent filtering performed in step 101 which shown in FIG. 1 requires that mode and size data should be passed from module 1602 to RSAF 1608. Quadtree partitioning data stored in LCU partitioning buffer 1604 is also used by RSAF 1608 to perform the step 102 of FIG. 1. From FIG. 16 it could be also noticed that RSAF 1608 shares reference sample buffer 1612 with RSDF 1614. The details of joint usage of reference sample buffer 1612 by RSAF 1608 and RSDF 1614 is given in the description of FIG. 1 for step 103. RSDF module could be performed using the same hardware 1615 as ILDF 1613. However, RSDF 1614 could be a separate module as well. ILDF 1613 reduces blocking artifacts introduced by quantization 1603. Deblocked picture is further processed by non-linear sample adaptive offset (SAO) 1616. However, applying SAO 1616 is not mandatory.

Resulting picture 1617 could be output from encoder and should coincide with the one produced by the decoder from the bitstream produced by the encoder. This output picture could be stored in the decoded picture buffer 1618 such that inter prediction module 1610 could use it for motion compensation.

Figure 17:
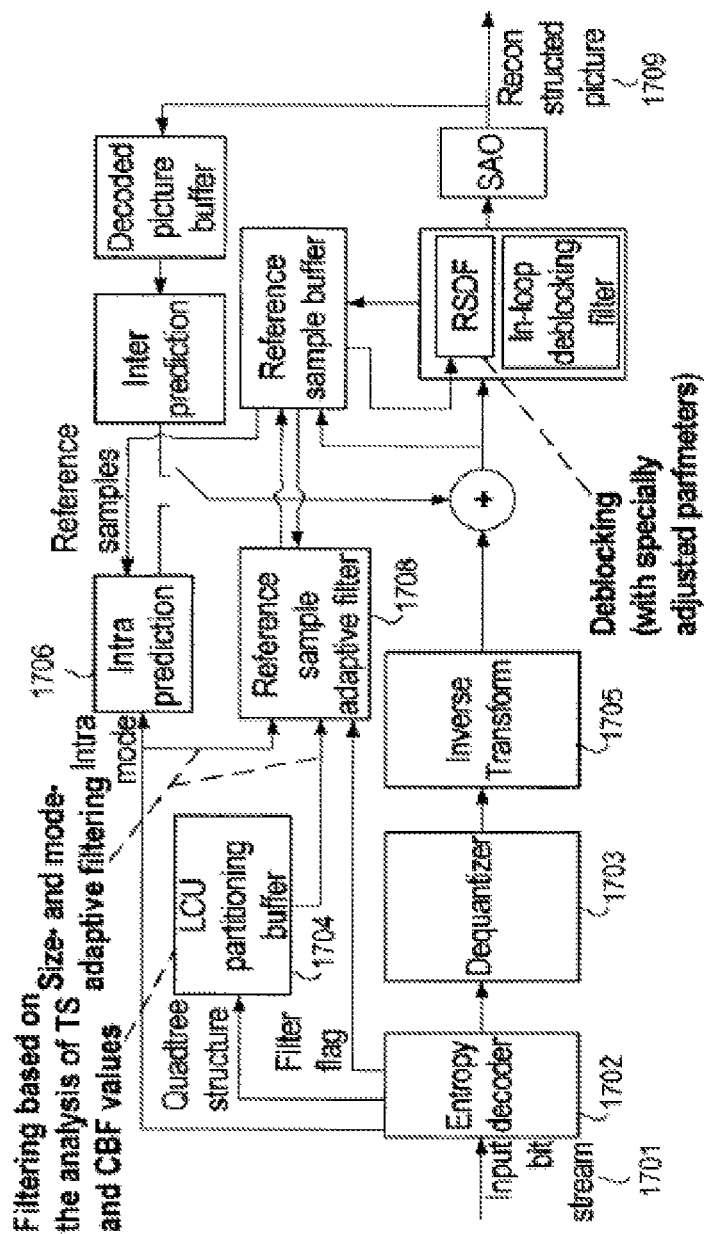
FIG. 17 shows a simplified block diagram of an example embodiment of a decoding apparatus according to an embodiment of the application.

FIG. 17 shows a simplified block diagram of an example embodiment of a decoding apparatus according to an exemplary embodiment of the application. The encoded input bitstream 1701 is processed by an entropy decoder 1702. Some of the decoded values correspond to quantized transform coefficients. These values are further processed by a de-quantizer 1703. The result of this process are values of coefficients that are suitable for inverse transform 1705 process.

Other values restored by entropy decoder 1702 from the input bitstream 1701 could be used to restore quadtree partitioning. The restored quadtree data are further written to LCU partitioning buffer 1704.

The structure of the decoding apparatus and processing steps that it performs are same as for the encoder side (see FIG. 16). The output of the decoding process is reconstructed picture 1709 which should be the same as the one (denoted as 1617 in FIG. 16) that could be obtained during encoding process if the decoded input bitstream 1701 was generated during this encoding process.

Although some aspects have been described in the context of a method, it is clear that these aspects also represent a description of the corresponding apparatus suitably adapted to perform such method. In such apparatus a (functional or tangible) block may correspond to one or more method step or a feature of a method step. Analogously, aspects described in the context of a corresponding block or item or feature of a corresponding apparatus may also correspond to individual method steps of a corresponding method.

Furthermore, the methods described herein may also be executed by (or using) a hardware apparatus, like processor(s), microprocessor(s), a programmable computer or an electronic circuit. One or more of the most important method steps may be executed by such an apparatus. Where an apparatus has been described herein in terms of functional blocks, it should be further understood that those elements of the apparatus may be fully or partly implemented in hardware elements/circuitry. Individual hardware, like processor(s) or microprocessor(s), etc., may be used to implement the functionality of one or more elements of the apparatus.

In addition, where information or data is to be stored in the process of implementing a method step of functional element of an apparatus in hardware, the apparatus may comprise memory or storage medium, which may be communicably coupled to one or more hardware elements/circuitry of the apparatus.

It is also contemplated implementing the aspects of the embodiment of the application in hardware or in software or a combination thereof. This may be using a digital storage medium, for example a floppy disk, a digital versatile disc (DVD), a BLU-RAY, a compact disc (CD), a ROM, a programmable read-only memory (PROM), an erasable programmable read-only memory (EPROM), an electrically erasable programmable read-only memory (EEPROM) or a FLASH memory, having electronically readable control signals or instructions stored thereon, which cooperate (or are capable of cooperating) with a programmable computer system such that the respective method is performed. A data carrier may be provided which has electronically readable control signals or instructions, which are capable of cooperating with a programmable computer system, such that the method described herein is performed.

It is also contemplated implementing the aspects of the embodiment of the application in the form of a computer program product with a program code, the program code being operative for performing the method when the computer program product runs on a computer. The program code may be stored on a machine readable carrier.

The above described is merely illustrative, and it is understood that modifications and variations of the arrangements and the details described herein will be apparent to others skilled in the art. It is the intent, therefore, to be limited only by the scope of the impending claims and not by the specific details presented by way of description and explanation above.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed:

1. A method for reconstructing blocks of an image using prediction, the method comprising:
   determining reference samples of one or more already decoded blocks for predicting a block to be reconstructed, the reference samples corresponding to a prediction mode employed for encoding the block to be reconstructed;
   selecting a first subset of the reference samples and a second subset of the reference samples;
   determining first filter parameters for the first subset of the reference samples and second filter parameters for the second subset of the reference samples based on the prediction mode and a size of the block to be reconstructed, the first filter parameters being different than the second filter parameters;
   performing pre-prediction filtering of the first subset of the reference samples and the second subset of the reference samples using the first filter parameters and the second filter parameters, respectively, to generate pre-prediction filtered reference samples; and
   reconstructing the block to be reconstructed by prediction based on the reference samples including the pre-prediction filtered reference samples.

2. The method according to claim 1, further comprising determining the size of the block to be reconstructed and the prediction mode.

3. The method according to claim 2, wherein intra-prediction is used for reconstructing the block, determining the prediction mode employed for encoding the block to be reconstructed comprises determining whether the intra-prediction is according to a vertical mode, a horizontal mode, or an angular mode, and the pre-prediction filtering is performed using the first filter parameters and the second filter parameters when the prediction mode corresponds to the angular mode.

4. The method according to claim 1, wherein the second subset comprises reference samples of one or more blocks for which no residual has been coded in an encoded video stream.

5. The method according to claim 1, further comprising applying, subsequent to performing the pre-prediction filtering, a deblocking filter to first filtered reference samples of the pre-prediction filtered reference samples of different decoded blocks, wherein the first filtered reference samples are reference samples at boundaries between decoded blocks.

6. A method for reconstructing blocks of an image using prediction, the method comprising:
   determining reference samples of one or more already decoded blocks for predicting a block to be reconstructed, the reference samples corresponding to a prediction mode employed for encoding the block to be reconstructed;
   selecting a first subset of the reference samples and a second subset of the reference samples;
   determining first filter parameters for the first subset of the reference samples and second filter parameters for the second subset of the reference samples based on the prediction mode and a size of the block to be reconstructed, the first filter parameters being different than the second filter parameters;
   performing first pre-prediction filtering of the first subset of the reference samples and the second subset of the reference samples using the first filter parameters and the second filter parameters, respectively, to generate first filtered reference samples;
   selecting a third subset of the reference samples for which no residual has been coded in an encoded video stream;
   performing second pre-prediction filtering of the third subset of the reference samples using third filter parameters to generate second filtered reference samples; and
   reconstructing the block by prediction based on the reference samples including at least some of the first filtered reference samples, the second filtered reference samples, or a combination thereof.

7. The method according to claim 6, wherein the first filter parameters, the second filter parameters, or both, are different than the third filter parameters.

8. The method according to claim 6, wherein the third subset of the reference samples includes one or more reference samples in at least one of the first subset or the second subset.

9. The method according to claim 6, further comprising performing deblocking using a deblocking filter, wherein the first and second pre-prediction filtering are performed prior to performing the deblocking.

10. The method according to claim 9, wherein the deblocking is performed on one or more of the first filtered reference samples or the second filtered reference samples.

11. The method according to claim 10, wherein the one or more of the first filtered reference samples or the second filtered reference samples on which the deblocking is performed are reference samples at boundaries between decoded blocks.

12. The method according to claim 11, further comprising:
   adding a decoded residual for the block to be decoded to the block to be reconstructed in order to obtain a decoded block; and
   applying an in-loop deblocking filter to the decoded block.

13. The method according to claim 6, wherein the reference samples form two one-dimensional arrays, one array comprises a column of samples of one or more decoded neighboring blocks to the left or right of the block to be decoded, and the other array comprises a row of samples of one or more decoded neighboring blocks on top or bottom of the block to be decoded.

14. The method according to claim 6, wherein the first pre-prediction filtering comprises applying a smoothing filter to the first subset of the reference samples and the second subset of the reference samples according to the first filter parameters and the second filter parameters, respectively.

15. The method according to claim 6, wherein inter-prediction is used for reconstructing the block to be reconstructed.

16. The method according to claim 15, wherein the reference samples define a two-dimensional reference area within one or more decoded blocks used for inter-prediction when reconstructing the block, and wherein one of the first or second subsets of the reference samples comprises reference samples belonging to a decoded block for which a residual was encoded in an encoded video stream.

17. The method according to claim 15, wherein the third subset of the reference samples is selected based on one or more code block flag (CBF) values of one or more of the one or more already decoded blocks that include the third subset of the reference samples.

18. The method according to claim 16, wherein the third subset of the reference samples is selected when the CBF values equal zero.

19. An apparatus for reconstructing blocks of an image using prediction, the apparatus comprising:
 a reference sample buffer for storing one or more already decoded blocks including reference samples used for predicting a block to be reconstructed, the reference samples corresponding to a prediction mode employed for encoding the block to be reconstructed;
 a processor configured to:
  select a first subset of the reference samples and a second subset of the reference samples; and
  determine first filter parameters for the first subset of the reference samples and second filter parameters for the second subset of the reference samples based on the prediction mode and a size of the block to be reconstructed, the first filter parameters being different than the second filter parameters;
 a filter coupled to the processor and adapted to perform pre-prediction filtering of the first subset of the reference samples and the second subset of the reference samples using the first filter parameters and the second filter parameters, respectively, to generate pre-prediction filtered reference samples; and
 a predictor coupled to the processor and configured to reconstruct the block by prediction based on the reference samples including the pre-prediction filtered reference samples.

20. A non-transitory computer-readable storage medium storing instructions that, when executed by a processor, cause the processor to:
 determine reference samples of one or more already decoded blocks used for predicting a block to be reconstructed, the reference samples corresponding to a prediction mode employed for encoding the block to be reconstructed;
 select a first subset of the reference samples and a second subset of the reference samples;
 determine first filter parameters for the first subset of the reference samples and second filter parameters for the second subset of the reference samples based on the prediction mode and a size of the block to be reconstructed, the first filter parameters being different than the second filter parameters;
 perform pre-prediction filtering of the first subset of the reference samples and the second subset of the reference samples using the first filter parameters and the second filter parameters, respectively, to generate pre-prediction filtered reference samples; and
 reconstruct the block by prediction based on the reference samples including the pre-prediction filtered reference samples.

* * * * *